US010174890B2

(12) United States Patent
Di Trapani et al.

(10) Patent No.: US 10,174,890 B2
(45) Date of Patent: Jan. 8, 2019

(54) LIGHT SOURCE AND SUNLIGHT IMITATING LIGHTING SYSTEM

(71) Applicant: COELUX S.R.L., Lomazzo (CO) (IT)

(72) Inventors: Paolo Di Trapani, Cavallasca (IT); Davide Magatti, Capiago Intimiano (IT)

(73) Assignee: CoeLux S.r.l., Como (IT)

( * ) Notice: Subject to any disclaimer, the term of this patent is extended or adjusted under 35 U.S.C. 154(b) by 0 days.

(21) Appl. No.: 15/310,296

(22) PCT Filed: May 13, 2014

(86) PCT No.: PCT/EP2014/001293
§ 371 (c)(1),
(2) Date: Nov. 10, 2016

(87) PCT Pub. No.: WO2015/172794
PCT Pub. Date: Nov. 19, 2015

(65) Prior Publication Data
US 2017/0146204 A1    May 25, 2017

(51) Int. Cl.
*F21S 4/20* (2016.01)
*F21S 8/00* (2006.01)
(Continued)

(52) U.S. Cl.
CPC ......... *F21S 8/006* (2013.01); *F21S 4/20* (2016.01); *F21S 8/02* (2013.01); *F21V 5/007* (2013.01);
(Continued)

(58) Field of Classification Search
CPC .......... F21S 8/006; F21S 4/20; F21V 7/0083; F21V 7/06; F21V 17/06; F21V 5/007;
(Continued)

(56) References Cited

U.S. PATENT DOCUMENTS 1,406,115 A *  2/1922  Verch ............... F21S 48/1388
                                                     362/232
7,414,269 B2 *  8/2008  Grotsch ............... F21K 99/00
                                                     257/100
(Continued)

FOREIGN PATENT DOCUMENTS

GB          2450192 C      12/2008
JP       2011114086 A       6/2011
(Continued)

OTHER PUBLICATIONS

Emmanuel Berthommé, European International Searching Authority, International Search Report and Written Opinion, counterpart PCT Application No. PCT/EP2014/001293, dated Jan. 19, 2015, 11 pages total.

(Continued)

*Primary Examiner* — Alexander K Garlen
*Assistant Examiner* — Colin J Cattanach
(74) *Attorney, Agent, or Firm* — DiBerardino McGovern IP Group LLC

(57) ABSTRACT

An optical system (2A) is disclosed for receiving and collimating light, wherein the optical system (2A) comprises a collimation unit (200) comprising at least one parabolic interface (220, 230) that defines an inlet opening (212) and an outlet opening (214), wherein the at least one parabolic interface (220, 230) is configured to reflect light entering through the inlet opening (212) through the outlet opening (214) and limit the angular spread of the light to an acceptance angle ($\theta_{CPC}$) associated with the at least one parabolic interface (220, 230); and a homogenization unit (300) for homogenizing the light emerging from the collimation unit (200), the homogenization unit (300) comprising a lens array with pairs of a first lens and a second lens, wherein the lens array is configured such that light from the outlet opening (214) collected by a first lens illuminates the (Continued)

respective second lens to provide for a continuously emitting output aperture.

58 Claims, 8 Drawing Sheets

(51) Int. Cl.
| | |
|---|---|
| F21S 8/02 | (2006.01) |
| F21V 5/00 | (2018.01) |
| F21V 7/00 | (2006.01) |
| F21V 7/06 | (2006.01) |
| F21V 9/02 | (2018.01) |
| G02B 3/00 | (2006.01) |
| G02B 5/00 | (2006.01) |
| G02B 5/02 | (2006.01) |
| F21V 17/06 | (2006.01) |
| G02B 19/00 | (2006.01) |
| G02B 27/09 | (2006.01) |
| G02B 27/30 | (2006.01) |
| F21Y 105/10 | (2016.01) |
| F21Y 115/10 | (2016.01) |

(52) U.S. Cl.
CPC ............ *F21V 7/0083* (2013.01); *F21V 7/06* (2013.01); *F21V 9/02* (2013.01); *F21V 17/06* (2013.01); *G02B 3/0062* (2013.01); *G02B 5/003* (2013.01); *G02B 5/0242* (2013.01); *G02B 5/0278* (2013.01); *G02B 19/0028* (2013.01); *G02B 19/0066* (2013.01); *G02B 27/0961* (2013.01); *G02B 27/30* (2013.01); *F21Y 2105/10* (2016.08); *F21Y 2115/10* (2016.08)

(58) Field of Classification Search
CPC .... G02B 5/003; G02B 5/0278; G02B 5/0242; G02B 27/30
See application file for complete search history.

(56) References Cited

U.S. PATENT DOCUMENTS

| | | | |
|---|---|---|---|
| 8,068,285 B1 | 11/2011 | Flynn | |
| 9,664,847 B2* | 5/2017 | Krenn | ................ F21S 48/1154 |
| 2004/0156130 A1 | 8/2004 | Powell et al. | |
| 2005/0122487 A1* | 6/2005 | Koyama | ................ A47F 11/06 |
| | | | 353/94 |
| 2005/0185416 A1* | 8/2005 | Lee | ............. F21V 5/02 |
| | | | 362/551 |
| 2006/0215401 A1* | 9/2006 | Menzel | .................. G02B 3/005 |
| | | | 362/235 |
| 2007/0121085 A1 | 5/2007 | Dewald | |
| 2007/0263298 A1* | 11/2007 | El-Ghoroury | ............ H04N 5/74 |
| | | | 359/726 |
| 2008/0043466 A1* | 2/2008 | Chakmakjian | .......... F21V 5/007 |
| | | | 362/237 |
| 2009/0086482 A1* | 4/2009 | Wilm | ......... F21K 9/00 |
| | | | 362/235 |
| 2010/0226127 A1* | 9/2010 | Bigliatti | .................... F21V 5/00 |
| | | | 362/235 |
| 2010/0309665 A1 | 12/2010 | Young et al. | |
| 2011/0044022 A1* | 2/2011 | Ko | ..................... G02B 19/0066 |
| | | | 362/84 |
| 2011/0170286 A1* | 7/2011 | Tessnow | ............... F21V 7/0083 |
| | | | 362/235 |
| 2012/0127710 A1* | 5/2012 | Jurik | ....................... F21V 5/008 |
| | | | 362/235 |
| 2013/0021775 A1* | 1/2013 | Veerasamy | ............. F21V 29/20 |
| | | | 362/84 |
| 2013/0294045 A1 | 11/2013 | Morgenbrod | |
| 2014/0029235 A1* | 1/2014 | Onac | ......................... F21V 9/02 |
| | | | 362/2 |
| 2015/0124469 A1* | 5/2015 | Krenn | ................. F21S 48/1154 |
| | | | 362/511 |
| 2017/0175978 A1* | 6/2017 | Geisler | ............... G02B 6/0096 |

FOREIGN PATENT DOCUMENTS

| | | |
|---|---|---|
| WO | 2008139355 A1 | 11/2008 |
| WO | 2008152576 A1 | 12/2008 |
| WO | 2009156347 A1 | 12/2009 |
| WO | 2009156348 A1 | 12/2009 |
| WO | 2010007504 A1 | 1/2010 |
| WO | 2013011481 A2 | 1/2013 |
| WO | 2013142437 A1 | 9/2013 |
| WO | 2013183072 A1 | 12/2013 |
| WO | 2014076656 A1 | 5/2014 |
| WO | 2015135560 A1 | 9/2015 |

OTHER PUBLICATIONS

Office Action, counterpart Russian Patent Application No. 2016 148 684, dated May 18, 2018, 8 pages total (including English translation of 2 pages).

Extended European Search Report, counterpart European Patent Application No. 18163136.7, dated Jun. 22, 2018, 9 pages total.

* cited by examiner

LIGHT SOURCE AND SUNLIGHT IMITATING LIGHTING SYSTEM

TECHNICAL FIELD

The present disclosure relates generally to lighting systems, and in particular to a light source for lighting systems intended, for example, for imitating natural sunlight illumination. Moreover, the present disclosure relates generally to generating a light beam from an area with high brightness and homogeneity of the luminance across the area.

BACKGROUND

Artificial lighting systems for closed environments often aim at improving the visual comfort experienced by users. In particular, lighting systems are known which imitate natural lighting, specifically sunlight illumination, in particular using light with a high correlated color temperature (CCT), and a large color rendering index (CRI). The characteristics of such a to be imitated outdoor lighting depend on the interaction between the sunlight and the earth atmosphere and create a specific shade characteristic.

EP 2 304 478 A1, EP 2 304 480 A1, PCT/IB2013/060141 filed on 14 Nov. 2013 as well as PCT/EP2014/000835 filed on 27 Mar. 2014, all filed by the same applicant, disclose lighting systems with a light source producing visible light, and a panel containing nanoparticles. During operation of the lighting system, the panel receives the light from the light source and acts as a so-called Rayleigh diffuser, namely it diffuses light rays similarly to the earth atmosphere in clear-sky conditions. Specifically, the concept uses directed light, which corresponds to sunlight and generates shadows in presence of lit objects, and diffused light with a larger CCT, which corresponds to the light of the blue sky.

For providing cool white light as well as warm white light, LED based light sources may be used that are based on, for example, phosphor-converted white LEDs and/or a combination of various color LEDs. The optical properties of light emitted from LEDs require beam shaping optical configurations, usually collimating optics such as lens and/or mirror systems.

The present disclosure is directed, at least in part, to improving or overcoming one or more aspects of prior systems.

SUMMARY OF THE DISCLOSURE

In a first aspect, the present disclosure is directed to an optical system for receiving and collimating light, wherein the optical system comprises a collimation unit and a homogenization unit for homogenizing the light emerging from the collimation unit. The collimation unit comprises at least one parabolic interface that defines an inlet opening and an outlet opening, wherein the at least one parabolic interface is configured to reflect light entering through the inlet opening through the outlet opening and limit the angular spread of the light to an acceptance angle associated with the at least one parabolic interface. The homogenization unit comprises a lens array with pairs of a first lens and a second lens, wherein the lens array is configured such that light from the outlet opening collected by a first lens illuminates the respective second lens to provide for a continuously emitting output aperture.

In another aspect, a light source comprises a light emitting unit with a light emission pattern such as a Lambertian or quasi-Lambertian emission pattern of a planar LED and an optical system as described above, wherein the light emission pattern overlaps with the inlet opening of the optical system.

In another aspect, a lighting system comprises a light source as described above for providing a light beam of directed non-diffused light with a first correlated color temperature along a main light beam direction, and a window-like unit such as a lighting system exit window or a diffused light generator for generating diffused light at a second correlated color temperature, which is larger than the first correlated color temperature. The window-like element is positioned in the far field of the light beam and the size of the window-like element is adapted to the size of the far field of the light beam.

Further embodiments are given, for example, in the dependent claims, which are herein incorporated by reference.

Other features and aspects of this disclosure will be apparent from the following description and the accompanying drawings.

DETAILED DESCRIPTION

Figure 1:
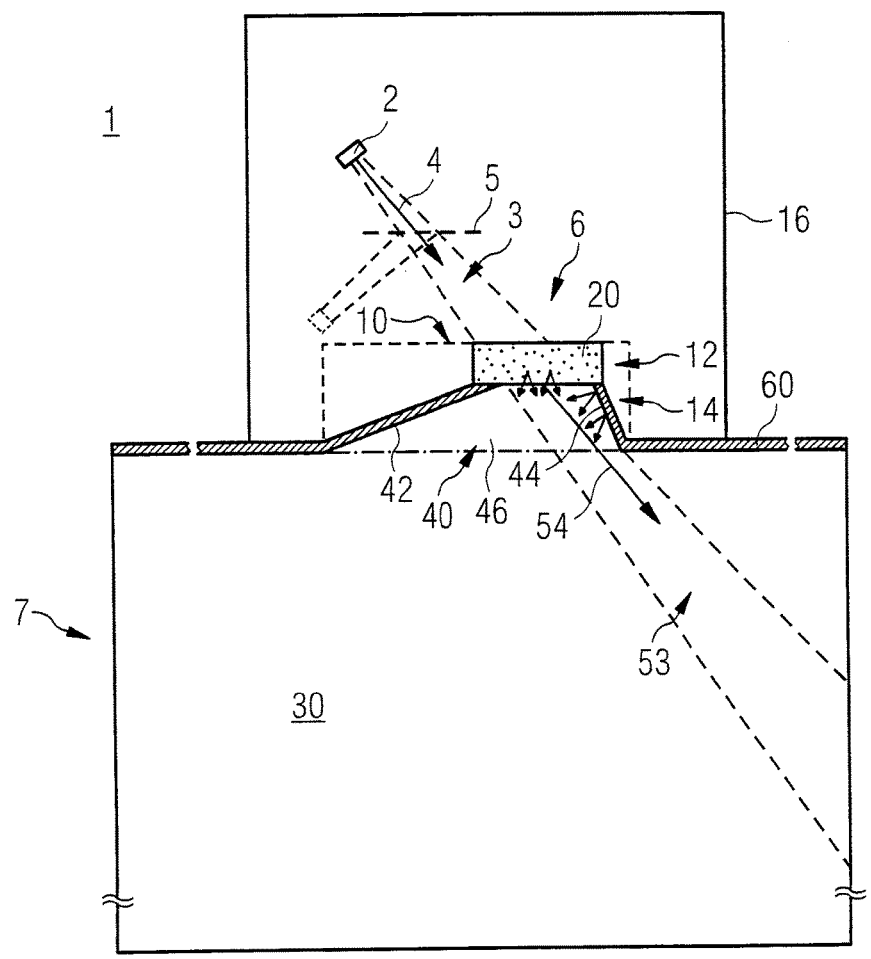
FIG. 1 is a schematic cross-section of an exemplarily lighting system illuminating a room.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that lighting systems imitating sunlight illumination need to provide light with properties that avoid that an observer realizes the artificiality of the light source, i.e. the sun-imitation. For example, the illumination situation can include a blue skylight light component and a directed non-diffuse white light component originating from a source with a homogenous luminance.

In general, the capability of an observer to evaluate an illumination situation is based on multiple physiological and psychological mechanisms connected to focusing, binocular convergence, binocular parallax, movement parallax, luminance, size, contrast, aerial perspective, etc. Some mechanisms may gain significance compared to the others according to both the observing conditions (e.g., whether the observer is moving or still, watching with one or two eyes, etc.) as well as the characteristics of the illumination situation such as whether objects with known size, distance or luminance are observed.

For sunlight imitating illumination devices using a light source as the artificial sun, the effect of perception of the light source as being the sun at infinite distance is related to avoiding—whenever the light source is in the field of view of the observer—impressions of an artificial light source.

The inventors realized that this includes in particular a homogenous luminance of the light source. Moreover, an artificial sun needs to have a round appearance. In some embodiments, where the light source is used to illuminate a Rayleigh diffusion panel, a thoroughly and uniformly illumination of the Rayleigh diffusion panel by the light source is additionally desired.

The sensitivity of the eye will identify already at a very early stage modulations of the luminance over the sun-imitation as well as over the Rayleigh diffusion panel. Such modulations can be created by (dark) areas in the near field reduced or even not contributing to the light emission resulting in less luminance in an area of the beam in the far field.

Additionally, although the brightness of the source may not allow looking into the source and focus thereon, the after-image produced on the retina may show intensity fluctuations that one was not aware of when (briefly) looking at the artificial sun.

For completeness, the luminance also affects the shadow created by the light source. In particular, when the artificial sun has modulations in luminance, the half-shadow may also show modulations that the eye will resolve.

Similar considerations apply to the spatial distribution of the color spectrum and modulations thereon.

The inventors realized that—in contrast to projector light sources, which concentrate on an image in the far field—the light source of a sunlight imitating illumination device also requires a specific near field that imitates the appearance of the sun when looked at by an observer. As disclosed herein, a system of optical elements is described that is specifically designed in various aspects that each contribute to the luminance of the light source and the maintenance of the etendue as far as possible.

In the following, exemplary configurations of a sunlight imitating illumination device are described in connection with FIGS. 1 and 2. An exemplary overview of an optical beam path is described in connection with FIG. 3. Various exemplary configurations of optical units contributing to the optical beam path are then disclosed in connection with FIG. 4 (LED-based emitter unit), with FIGS. 5 and 6 (compound parabolic concentrator (CPC)-based collimator unit), with FIGS. 7 and 8 (fly's eye condenser (FEC)-based homogenization unit), and with FIG. 9 (a mounted optical system).

Referring to FIG. 1, a lighting system 1 is illustrated schematically in a cut view.

In detail, lighting system 1 comprises a light source 2, configured to emit light in an emission solid angle to form a light beam 3 propagating along a main light beam direction 4. Generally, light source 2 can be, for example, a cool white light source. Exemplary embodiments of light sources may comprise LED based light emitters or discharge lamp based light emitters or hydrargyrum medium-arc iodide lamp based light emitters or halogen lamp based light emitters and respective optical systems downstream of the respective light emitter.

To reduce the dimension of lighting system 1, the optical systems downstream of the respective light emitter may include a reflective system (such as folding optics, a mirror 5 is exemplarily indicated by a dashed line in FIG. 1). Specific examples of reflective systems passed by light beam 3 are illustrated in the above identified patent applications, e.g. PCT/IB2013/060141.

For the reflective system, there may be geometric condition on reflected light rays requiring that no light ray originating from outside lighting system can be subsequently reflected by the reflective system in a manner such that it leaves again the lighting system 1.

Lighting system 1 further includes a window-like unit 6 that couples the light originating from light source 2 to a region 7 to be lit up, for example, an interior room 30 of a building.

In the exemplary embodiment of lighting system 1 of FIG. 1, window-like unit 6 includes a lamp shade-like structure 10 that comprises a bottom unit 12 and a screen structure 14. Bottom unit 12 is referred to as bottom unit in view of it being at the bottom of the lamp shade-like structure when look at from the room. However, it is noted that the lamp system may be provided without a lamp shade-like structure or in walls, and, accordingly, bottom unit 12 does not need to be at a lower end of the lamp shade-like structure. For a detailed disclosure on screen structure 14, it is referred to the above mentioned patent applications, e.g. PCT/EP2014/000835.

In some embodiments of window-like unit 6, bottom unit 12 may be integrated directly into the wall/ceiling, i.e. without the screen structure 14. For example, bottom unit may be formed as a part of the ceiling surface instead of being removed from the ceiling surface as shown in FIG. 1.

Window-like unit 6 may be of any shape such as a (planar) rectangular, quadratic, or circular shape. Window-like unit 6 is at least partly transmitting the light of light source 2. Window-like unit 6 may comprise—in FIG. 1 specifically bottom unit 12 comprises—a diffused light generator 20. Diffused light generator 20 operates as a Rayleigh diffuser, which substantially does not absorb light in the visible range and which diffuses more efficiently the short-wavelength in respect to the long-wavelength components of the impinging light. Optical properties and microscopic characteristic of Rayleigh like diffusers are described in detail in the above mentioned patent applications, e.g. EP 2 304 478 A1.

Lighting system 1 further may include a dark box 16 encompassing light source 2 and having window-like unit 6 in one of its walls integrated. In general, box 16 provides walls that extend around light source 2 and border to window-like unit 6 and have a dark, light absorbing inner surface (at least where potentially light can impinge).

In the embodiment of FIG. 1, light source 2 is provided within dark box 16 thereby avoiding light originating not from light source 2 to enter bottom unit 12 from within dark box 16.

In some embodiments, window-like unit provides diffused light generator 20 to diffuse the light of light source 2. For example, assuming in the former embodiments that light beam 3 is diverging enough to illuminate the complete or at least a large portion of diffused light generator 20, diffused light generator 20 will separate light beam 3 in four components, particularly in:

a transmitted (directed non-diffuse) component, formed by light rays that pass through diffused light generator 20 and do not experience significant deviations, e.g. is formed by light rays experiencing a deviation smaller than 0.1°; a luminous flux of the transmitted component is a significant fraction of the overall luminous flux incident on diffused light generator 20;

a forward diffuse component, formed by scattered light exiting diffused light generator 20 into light passage 46 (with the exception of that light beam direction and of directions differing from that light beam direction by an angle smaller than 0.1°); a luminous flux of the forward diffuse component corresponds to a blue skylight fraction generated from the overall luminous flux incident on diffused light generator 20;

a backward diffuse component, formed by scattered light exiting diffused light generator 20 into box 16; a luminous flux of the backward diffuse component is, in general, in the range of but preferably less than the blue skylight fraction; and a reflected component, formed by reflected light and propagating along a direction at a mirror angle into box 16, a luminous flux of the reflected component depends, for example, on the incident angle of the light beam onto diffused light generator 20.

That having being stated, the optical properties of diffused light generator 20 are such that the blue skylight fraction is within the range from 5% to 50%, such within the range from 7% to 40%, or even in the range from 10% to 30%, or within the range from 15% to 20%;

the average CCT of the forward diffuse component is significantly higher than the average correlated color temperature CCT of the transmitted component, for example it may be higher by a factor of 1.2, or 1.3, or 1.5 or more;

diffused light generator 20 does not absorb significantly incident light, namely the sum of the four components is at least equal to 80%, or 90%, or even 95%, or 97% or more;

diffused light generator 20 scatters mostly forward, namely more than 1.1, or 1.3, or even 1.5, or 2 two times more than is back scattered; and diffused light generator 20 may have low reflection, namely less than a portion of 9%, or 6%, or even less than 3%, or 2% of the impinging light is reflected.

In the embodiment of window-like unit 6 comprising diffused light generator 20, diffused light generator 20 may be at a distance from light source 2 that may not be sufficient for providing a sun-like impression when light source 2 would be in sight for an observer. However, in some embodiments, screen structure 14 may block any view onto light source 2. Accordingly, the distance between the expected position of the observer and light source 2 may be less.

In other embodiments, diffused light generator may at least partly be illuminated by a separate light source adapted to provide light as the basis for the diffuse component.

In the embodiment of FIG. 1, light source 2 is vertically and horizontally displaced with respect to the center of window-like unit 6. For example, light source 2 illuminates the top surface of diffused light generator 20 in its entirety under an angle of, for example, about 45° or about 60°. In some embodiments, light source 2 may be arranged vertically above, for example, the center of diffused light generator 20, when, for example, diffused light generator 20 is tilted with respect to the plane of a room ceiling.

In the exemplary installation of lighting system 1 of FIG. 1, light source 2 is optically coupled to room 30 in a building via window-like unit 6. Room 30 may, for example, be shaped as a parallelepiped and delimited by lateral walls, a floor, and a ceiling 60.

Figure 2:
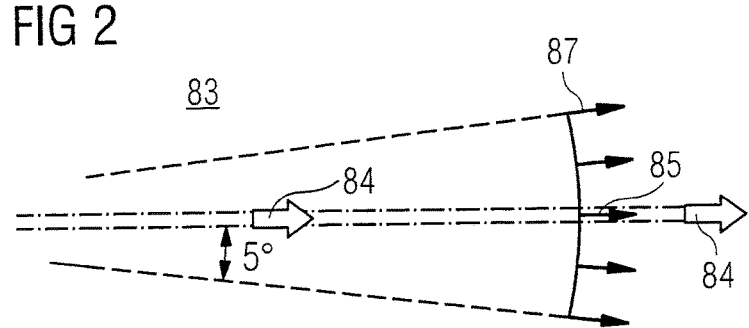
FIG. 2 is a schematic illustration of a light beam having a non-uniform direction of propagation across the beam.

In general, window-like unit 6 is in the far field of light source 2 such that it interacts with a light beam as illustrated in FIG. 2 and described below. Thereby, light source 2 may provide a sun-like impression.

In dependence of the height of room 30, the distance between light source 2 and window-like unit 6 is in the range of 1.5 m to 7 m for a light source having an exit aperture of 0.15 m. For such a situation, a distance between the light source and the observer is, for example, in the range from at least 2.5 m to 9 m.

FIG. 2 shows the divergent light beam 83 in the far field as used to illuminate the window-like unit 6. The far field depends on the near field as generated by light source 2 and is characterized by a main light beam direction 84. The local propagation direction across divergent light beam 83, i.e. a propagation direction of the directed non-diffused light, is modified in dependence of the position within the cross-section of divergent light beam 83. Specifically, a central propagation direction 85 is essentially parallel to main light beam direction 84 in an inner area of divergent light beam 83. However, a propagation direction 87 is increasingly inclined with respect to main light beam direction 84 with increasing distance from the inner area. Exemplarily, a maximum angle of 5° is indicated in FIG. 2 for the light beam being the furthest out, which corresponds to a beam divergence (herein also referred to as total angular spread in the far field) of 2×5°=10° of divergent light beam 83.

In the following, exemplary optical configurations of a lighting system are disclosed for generating such a divergent light beam. At first, an overview of an exemplary schematic optical beam path is described in connection with FIG. 3 and general functionality of the various units is explained. Then, various specific optical units are described in more detail further referring (in addition to FIG. 3) to respective specific figures.

In general, light source 2 includes an emitter unit 100, a collimation unit 200, and a homogenization unit 300, which are those optical units that define an optical near field 400. Herein, the combination of collimation unit 200 and homogenization unit 300 is referred to as optical system 2A, which receives light from emitter unit 100 through one or more openings and emits light through an exit aperture that is preferably fully flashed and represents a light emitting surface with a homogeneous luminance and an etendue that maintained as much of the original etendue of emitter unit 100.

Light source 2 may further include an electronic control unit (not shown) for providing the electronic background to operating the primary light generation process that takes place in emitter unit 100. Similarly, light source 2 may include structural components such as a housing to provide support for the optical units and position them in a fixed manner with respect to each other.

Downstream of light source 2, a propagation system 500 is schematically indicated within which the light beam's extension enlarges into an optical far field 600. In far field 600, the light beam then falls onto window-like unit 6. In some embodiments, propagation system 500 comprises reflective elements to fold the beam and/or collimate the beam when already have its far field properties, e.g. as shown in FIG. 2.

In general, the function of emitter unit 100 is to provide light in a manner that is adapted for good coupling into collimation unit 200, Moreover, the light is adapted to the aspect of illumination. In particular it is adapted to the interaction with window-like unit 6, e.g. to provide a desired color of the forward diffuse component. The adaptation relates inter alia to the emission direction distribution, the color spectrum, and the intensity distribution.

For example, light source 2 provides light in the visible region of the light spectrum with wavelengths between 400 nm and 700 nm with a spectral width larger than 100 nm, e.g. larger than 170 nm. In some embodiments, emitter unit 100 includes a single emitter or a plurality of emitters that alone or in combination provide the respective spectrum.

In general, the function of collimation unit 200 is to concentrate the angular spread of light directions of the incoming light. Thereby, the area of emission at its output side is increased to fulfil the etendue requirement. In addition, as much as possible of the luminance of the emitter unit 100 should be maintained. In other words, the function of collimation unit 200 is to collect radiation and uniformly project the radiation into a defined projection solid angle.

For the above disclosed lighting systems, the required total angular spread in the far field depends on the distance to and the size of the to be illuminated object, in this case the window-like unit 6. Orthogonal total angular spreads of 10° and 30°, respectively, for a rectangular object (window-like unit 6) with size 1 m×2 m being illuminated under 45° provide an acceptable distance between light source 2 and window-like element 6. As will be apparent to the skilled person, total angular spreads in the range from 5° to 60° or in the range from 5° to 50° would be applicable for lighting systems as discussed herein or other applications of the herein disclosed light source without deviating from the disclosed concepts. Similarly, total angular spreads of the same or different size in orthogonal directions as well as a rotation-symmetric total angular spread will be apparent to the skilled person in respective applications.

Collimation unit 200 is based on the concept of a parabolic concentrator, which transform an incoming angular spread of light directions to an output angular spread of light directions by reflection on parabolic interfaces.

The interplay of emitter unit 100 and collimation unit 200 allows various configurations depending on the type and size of light generation (for example, single LED or array of LEDs) and the required shape of the far field. For example, collimation unit 200 may be based on a single or an array of so called compound parabolic concentrators (CPCs) 210.

Figure 3:
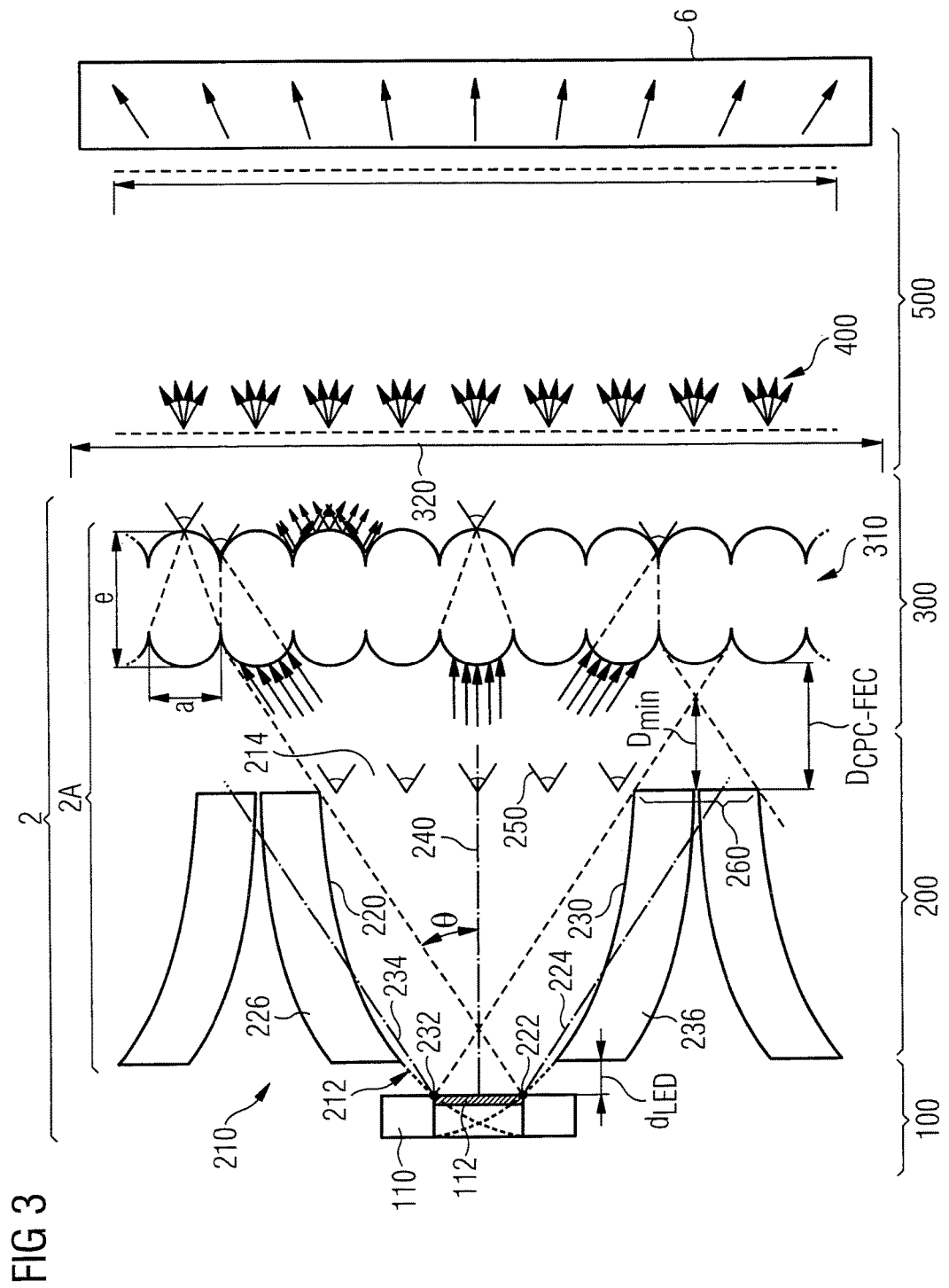
FIG. 3 is a schematic optical beam path of an exemplary light source.

As schematically illustrated in FIG. 3, CPC 210 generally has an inlet opening 212 and an outlet opening 214. Examples of CPCs include hollow concentrators and total internal reflection (TIR) concentrators (also referred to as dielectric CPCs). Hollow parabolic concentrators provide a highly reflective surface in the shape of a parabola, while TIR concentrators provide a material structure that provides an index of refraction transition in the shape of a parabola that results in total internal reflection. A TIR concentrator may be, for example, a polymer-based (such as SILICONE-based) material in the shape of a rotated parabola.

Referring again to FIG. 3, the basic shape of CPC 210 comprises opposing parabolic segments 220, 230 with different focal points 222, 232. Accordingly, a parabolic interface (i.e. a reflective surface for a hollow CPC or an interface of an index of reflection transition) connects inlet opening 212 and outlet opening 214. Focal point 222 of the parabola defined by parabolic segment 220 lies on the parabola defined by parabolic segment 230, whereas focal point 232 of the parabola defined by parabolic segment 230 lies on the parabola defined by parabolic segment 220. The two parabolic segments 220, 230 are symmetrical with respect to reflection through an axis 240 of CPC 210. Axis 240 extends along collimation unit in direction of the light transmission through CPC 210.

By definition, an axis 224 of parabola defined by parabolic segment 220 passes through focal point 222 and an axis 234 of parabola defined by parabolic segment 230 likewise passes through focal point 232. The angle that axis 224 of parabola 220 and axis 234 of parabola 230 make with axis 240 of CPC 210 defines the (output) total angular spread of CPC 210.

The total angular spread is defined as twice the acceptance angle $\theta_{CPC}$ when the CPC is symmetric, the wording originating from the CPC's use for collecting light in reverse direction. In that case, light entering outlet opening 214 at an incidence angle with respect to axis 240 less than the acceptance angle is reflected through the input opening and light with an incidence angle greater than the acceptance angle is not reflected to inlet opening. Herein, we will also refer to half the angular spread as the acceptance angle $\theta_{CPC}$ of CPC 210 despite the fact that CPC 210 is not accepting but providing light with an angle up to the acceptance angle $\theta_{CPC}$ relative to axis 240.

In other words, when using CPC 210 for collimation, light entering inlet opening 212 will leave outlet opening with a direction of propagation that is at most the acceptance angle $\theta_{CPC}$ as indicated by a series of opening angle illustrations 250 at outlet opening 214. It will be apparent to the skilled person that in real world embodiments, some losses will occur and accordingly also a minor population of larger angles may be present but in principle, CPC 210 will essentially provide a collimated light beam at its outlet opening 214 with a total angular spread of $2\theta_{CPC}$. In the application of sunlight imitation, staying as close as possible to the parabolic shape will increase the ray-tracing properties of the beam (less population of rays outside the total angular spread) as acceptance angle $\theta_{CPC}$ is only well defined with pure parabola configurations. Thus, in this respect, ray-tracing properties may be preferred over efficiency.

In view of the localization of the light entering the CPC 210 with respect to intensity and color when using, for example, localized LEDs of varying color, also the light exiting the CPC 210 may have some inhomogeneity across outlet opening 214 in intensity and color. Moreover, in the case of an array of CPCs 210, the thickness of walls 226, 236 of reflective CPC 210 will result in dark areas 260 between neighboring CPCs 210. Accordingly, when looking onto outlet opening 214, an observer may see some inhomogeneity such as a structure due to the localization of the light entering the CPC 210 as well as void areas 260.

In general, the function of homogenization unit 300 is to further homogenize the light emerging from collimation unit 200 and to produce a projection similar to that produced by collimation unit 200 but much more homogeneous (rectangular flat top in the far field) both in luminance and (in case) in color.

Homogenization unit 300 represents the last optical element that forms near field 400 and thus is, when looking onto light source 2, the optical element that determines the impression of the sun-imitation by an observer. In that context, the light emitting section of the output side of homogenization unit 300 is referred to as exit aperture 320 of light source 2. The diameter of an (approximated) circular exit aperture depends on the divergence and distance required for the sunlight imitating illumination. The diameter may be in the range from 80 mm to 400 mm (such as 100 mm or 150 mm or even larger than 400 mm) for beam divergences in the range from 5° to 50° and respective distances between the observer and light source 2.

The objective of homogenization unit 300 is to provide a nearly constant luminance across the beam in the near field, thus providing a constant intensity for varying observation angles in the far field of the beam. As described herein, paired lens configurations such as tandem double lens arrays can be used in homogenization unit 300 as optical elements.

Examples of tandem double lens arrays include fly's eye condenser (FEC) 310 or two lens arrays separated by air. In general, the lenses may be ellipsoidal to reduce spherical aberration. However, to maintain the angular distribution, usually two opposing lenses have an identical focal length f and are positioned at equal distance e=f n, n being the (averaged) index of refraction between the lenses. FEC 310 may, for example, be a bulk element of plastic with microlenses formed at opposite faces as micro-lens arrays ("micro"-lens refers to a lens with diameters in the range of or below millimeters, that size may be, for example, useful for exit apertures in the range of 0.1 to 0.2 mm; larger exit apertures may in principle also use larger lenses).

Homogenization unit 300 is adapted to the acceptance angle $\theta_{CPC}$ and remixes within small areas the light emitted from collimation unit 200. Homogenization unit 300 itself can be characterized by an acceptance angle that is selected in view of the acceptance angle of collimation unit 200, e.g. $\theta_{CPC}$ of CPC 210. Moreover, lateral extensions and positioning of lens pairs may be selected in view of specific configurations such as a CPC-array configuration of collimation unit 200 to avoid any repetition of patterns.

During propagation of the light beam within propagation system 500 over, for example, several meters, far field 600 develops from near field 400. In some embodiments, folding mirrors are present to reduce the size of propagation system 500 and/or some global refocussing optics is provided in propagation system 500 to adapt the size of the light beam to window-like unit 6.

In the following, exemplary embodiments of the optical units are disclosed for the specific configuration, where the sun-imitation requires a circular near field (circular exit aperture 320), the far field of which, however, is adapted to a rectangular geometry of a window-like unit.

In FIG. 3, emitter unit 100 is indicated exemplarily as the cross section of an LED 110 having an emitting area 112 facing inlet opening 210 of a single CPC 210. Emitting area 112 emits light in a large angular distribution range, e.g. for a planar LED in a Lambertian radiation pattern.

As shown in FIG. 3, CPC 210 is mounted at some distance $d_{LED}$ (measured in direction of axis 240) from the surface of LED 110 because the in FIG. 3 shown reflective hollow CPC could damage LED 110, when mounted directly thereon. Based on distance $d_{LED}$, some loss of light occurs for that light that is emitted into the gap between LED 110 and CPC 210 and thus is not collimated by CPC 210. Those losses may in principal be reduce when using a dielectric CPC that in principle—assuming a "soft" material such as SILICONE—could be contacting emitting area 112.

As further shown in FIG. 3, each of parabola 220 and parabola 230 extend through the respective lateral ends of emitting area 112, thereby allowing efficient collimation by positioning the source in the light collecting area of CPC 210. In other words, the position of emitting area 112 is at or upstream focal points 222, 232, thereby positioning the emitting area in the parabolic section that is collimated.

While in FIG. 3 for simplifying the illustration, only a single LED 110 with a single emitting area 112 is shown, in principle multiple LEDs may be used to emit into a single CPC 210 and/or an LED having multiple emitting areas. For example, multiple LEDs may be arranged in a one- or two-dimensional array that then is subject to a single CPC of the required geometry. However, any space between the emitting areas will not contribute and thus limit the etendue and additionally affect the homogeneity of the output of the CPC (the latter can be at least partly overcome by homogenization unit 300).

For a square shaped emitting area 112, a quadratic CPC with four identical parabolic shapes may be used, which will result in a quadratic near field and a quadratic far field with identical angular divergence in the orthogonal directions—assuming identical parabolic shapes. Similarly, a circular shaped emitting area 112 may be collected with a circular CPC, which results in a circular near field and a circular far field with axis symmetric angular divergence without FEC. For rectangular far field beams, a rectangular emitting area 112 may be used in combination with a rectangular CPC as discussed below.

For circular near fields, generally mask configurations could be applied. However, every mask will block light and thus reduce the efficiency. In contrast, an arrangement of multiple CPCs can approximate a circular shape as will be described below. In particular this can be done with rectangular CPCs to provide a rectangular far field or with circular CPCs to provide a circular far field.

Figure 4:
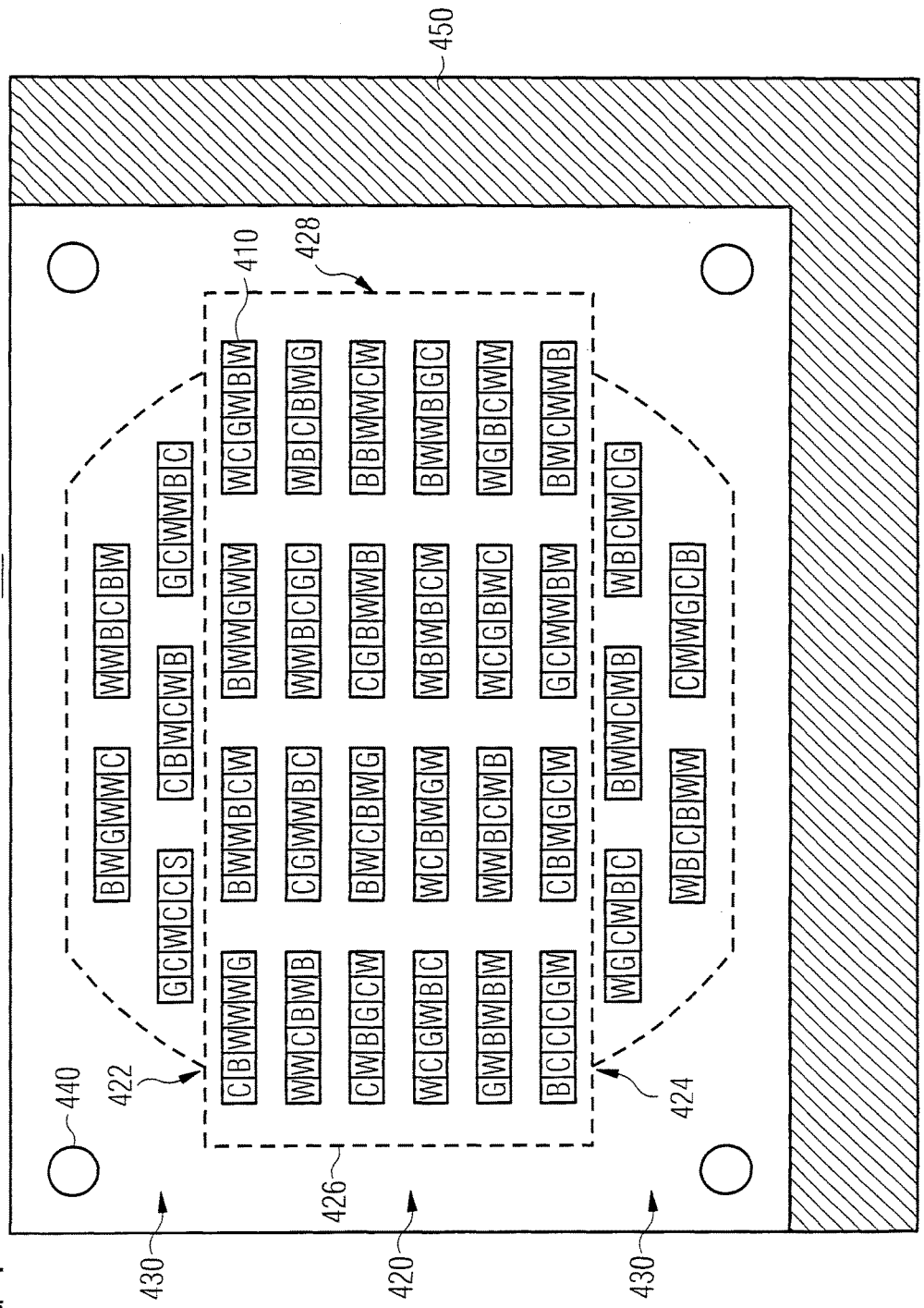
FIG. 4 is a schematic illustration of LED-based emitter unit.

In FIG. 4, an exemplary arrangement 400 of LEDs is shown that allows efficiently emitting into rectangular CPCs and in addition supports the circular shape of the exit aperture of lighting system 2A. Furthermore, the spectrum from a single CPC can be tuned by mixing various types of LEDs. The arrangement of multiple LEDs per CPC provides for the flexibility of a tunable light source on the CPC-level.

As an example, FIG. 4 shows an arrangement of cool white, warm white, green (cyan), and blue LEDs (referenced as C, W, G, and B, respectively) in LED frames 410 of six LEDs. Besides arranging the LED to homogeneously distributed their colors over all CPCs (no color modulation in appearance when looked at on the collimation unit 200 level), the various color type LEDs may also be distributed in their position within the LED frame 410 such that each position of the LED frame homogenously populates each position in the far field with all colors.

In FIG. 4, one LED frame 410 with six LEDs of 1 mm×1 mm emitting area size and a space of 0.5 mm in-between two neighboring LEDs (not shown) corresponds to the emitter for one CPC. In that configuration, the parabolas of a rectangular CPC delimiting the short end of LED frame 410 may extend through the respective lateral ends of the emitting areas of the first and last of the LEDs in the LED frame 410.

Moreover, the arrangement of FIG. 4 supports a circular near field. Specifically, emitting unit 100 comprises a central section 420 of rectangular shape (exemplarily shown as a matrix of six lines each having four LED frames 410) and two isosceles trapezoid like sections 430. Isosceles trapezoid like sections 430 are respectively arranged next to long sides 422, 424 of central section 420. In each isosceles trapezoid like section 430, the number of LED frames in each line is stepwise reduced by one until the length of the outer line extends approximately as long as central section 420 extends in direction of its short sides 426, 428 such that isosceles trapezoid like sections 430 approximate the shape of segments of a circle.

The embodiment of FIG. 4 represents a sample of emitter unit 100 that approximates—based on square LEDs arranged in close packing—a rectangular, continuous emitter devoted to rectangular (asymmetric) far-field projection.

In addition, emitting unit 100 may include a mounting structure (such as screw holes 440) to accurately mount collimating unit 300 onto, for example, the LED arrangement and ensure proper alignment in particular in the directions of the plane of LED frames 410.

Furthermore, emitting unit 100 may include a control section 450 providing the power to LED frames 410.

Not limiting the angular emission by a dome-lens or any other optics, for example directly attached to LED 110, allows feeding a large angular input to collimation unit 200 and populating the complete or at least large angular range of light propagation directions to collimation unit 200. In other words, the plane LED arrangement at the entrance of CPCs is configured to provide almost fully flashed surfaces at the entrance(s) of the CPC, which is not possible with a dome already collimating the light of the individual LEDs.

Light emitting devices other than LEDs may be used, for example, by providing a light source having a cover with opening(s) specifically adapted to the CPC inlet openings.

Figure 5:
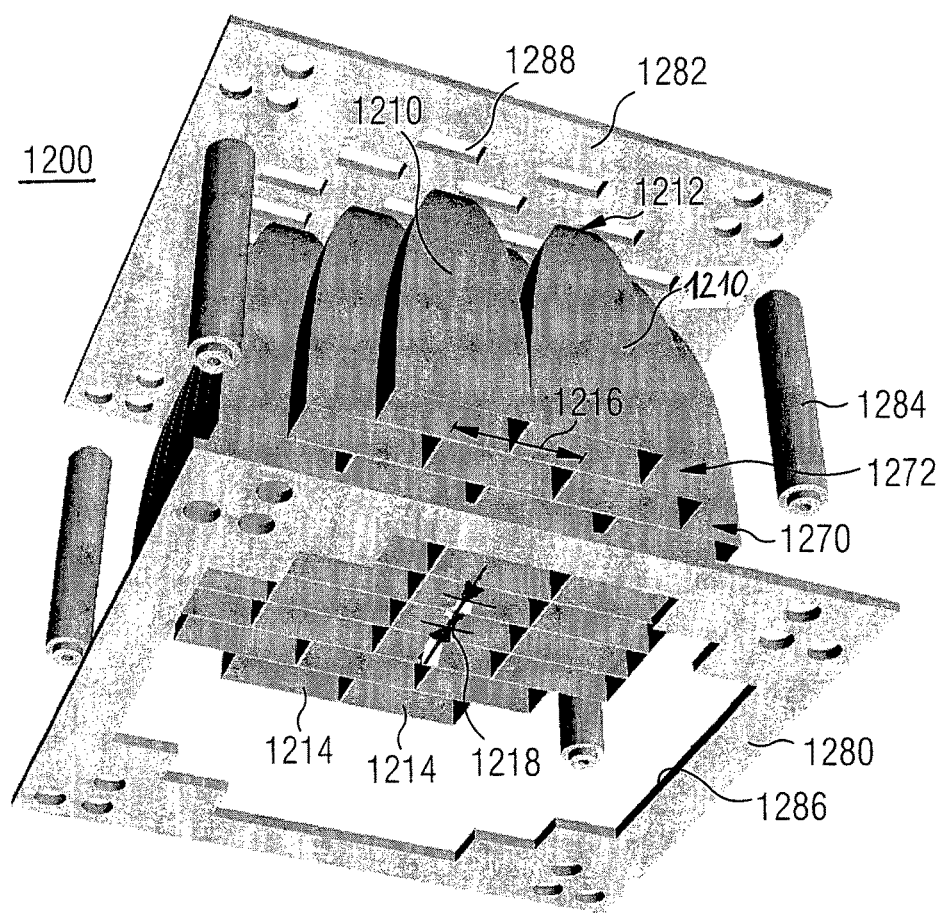
FIG. 5 is a schematic illustration of a compound parabolic concentrator-based collimation unit.

FIG. 5 shows a collimation unit 1200 configured to receive light of light emitting unit 100, such as the light of LED arrangement shown in FIG. 4.

Specifically, collimation unit 1200 is a two-dimensional array of rectangular CPCs 1210. In particular, rectangular CPCs 1214 are arranged one next to the other and are tightly packed. All rectangular CPC 1214 are equal and arranged so that their inlet openings 1212 lie in the same input plane and their outlet openings 1214 lie in the same output plane. The arrangement of all outlet openings 1214 composes a CPC exit aperture, which approximates a circular surface. Similarly, all inlet openings are positioned to receive light emitted from with a circular region such as provided by LED frames 410 of emitter unit 100.

To approximate the circular shape of the CPC exit aperture, collimation unit 1200 comprises rectangular CPCs 1214 forming a central section of rectangular shape (in FIG. 5 exemplarily a matrix of six lines of each four CPCs is shown) and two isosceles trapezoid like sections. Isosceles trapezoid like sections are respectively arranged next to long sides of central section. In each isosceles trapezoid like section, the number of CPCs in each line is stepwise reduced by one until the length of the outer line extends approximately as long as central section extends in direction of its short sides such that the shape of segments of a circle are approximated. In the example of FIG. 5, an inner line 1270 of each isosceles trapezoid like section comprises three and an outer line 1272 comprises two rectangular CPCs 1214.

Similarly, embodiments are possible in which the composed surface approximates an elliptical shape.

A single rectangular CPC 1214 has a rectangular inlet opening 1212 with, for example, a width of 1.2 mm slightly larger than the LED emitting area of 1 mm×1 mm (thereby exactly fitting to a single quadratic LED) and a length of about 9.0 mm slightly larger than a single rectangular LED frame 410. Moreover, a single rectangular CPC 1214 has an outlet opening 1214 with a width of about 12 mm and length of about 32 mm. For the hollow CPCs in FIG. 5, wall thickness is in the range of 0.2 mm to 1 mm such as 0.4 mm. Accordingly, the displacement pitches 1216,1218 of neighboring CPCs is the length/width of an outlet opening plus twice the wall thickness, corresponding to the physical extension of the CPC.

Rectangular CPC 1214 has a funnel-like shape and is formed by four parabolic reflective surfaces, each of which is one-dimensionally curved according to FIG. 3. The internal faces are mirror surfaces, for example of a metal aluminum sheet, and are highly reflective. Opposing internal faces are formed with an identical parabolic shape to provide at outlet opening 1214, for example, a total angular spread of 30° (across its length) and 10° degrees (across its width).

FIG. 5 further illustrates a mount configuration with a first mounting plate 1280, a second mounting plate 1282, and distance holding bars 1284, which in combination ensure the proper alignment of CPCs 1210. Specifically, first mounting plate 1280 comprises a positioning opening 1286, which in shape corresponds to the circumferential line of the CPC arrangement at the outlet side. Second mounting plate 1282 comprises for each CPC an individual positioning opening 1288, which in shape corresponds to the circumferential line of a single CPC 1210 at some distance to its inlet opening.

The correct alignment of first mounting plate 1260 and second mounting plate 1262 with respect to each other is achieved via distance holding bars 1284. Specifically, the plurality of identical CPCs 1210 is positioned at first in (and for example glued to) positioning opening 1286 of first mounting plate 1280. Then, second mounting plate 1282 with individual positioning openings 1288 is put over (and for example glued to) CPCs 1210. Finally, the mounting plates are attached to each other at a fix angle and distance via distance holding bars 1284.

In some embodiments, the CPCs are aligned with first mounting plate 1260 and then attached to each other and first mounting plate 1260, for example, by glue. Accordingly, second mounting plate 1262 may not be required.

Collimation unit 1200 allows to decouple the light beam characteristics, and in particular the shape of its cross-section and its divergence, from the shape of the beam when the beam exits collimation unit 1200.

In the present case, CPCs 1210 generate identical "unit light beams" having rectangular cross-section that are displaced with respect to each other by the size of a CPC. This displacement is small compared to the beam in the far field such that essentially all beams overlap each other to form a rectangular far field illumination. In practice, the unit light beams melt into one composite light beam that has the same rectangular cross-section and the same divergence as a single unit light beam. Therefore, the embodiment shown in FIGS. 4 and 5 allow for a composite beam to be generated, having a section, in a plane perpendicular to the axis of the composite beam itself and at a desired distance from light source 2, which is a rectangle of a desired area and shape.

Furthermore, the embodiment of FIGS. 4 and 5 enable to create a light source having an emitting surface which can have any shape, e.g. a circular or an elliptical shape. The size of outlet openings determines the step-like modified circumference. Although some mask may be used to remove those still existing steps of the circumferential line, in view of the high brightness of the beam, an observer—when looked at collimation unit 1200—will normally not notice those steps such that a mask may not be necessarily required and no losses due to blocking the beams may needed to be introduced.

Other shapes and types of reflective concentrators may be used. In general, the CPC may be hollow CPCs as well as TIR CPCs as discussed above.

In some embodiments, square emitting areas are combined with corresponding CPCs of a square type, which features a square input aperture and a square output aperture. In such a way, each emitting device generates a square beam, which may have the same divergence in two orthogonal directions.

In some embodiments, circular emitting areas are combined with corresponding CPCs of a circular type, which features a circular input aperture and a circular output aperture. In this case, the CPCs generate a beam with a circular symmetry.

Figure 6:
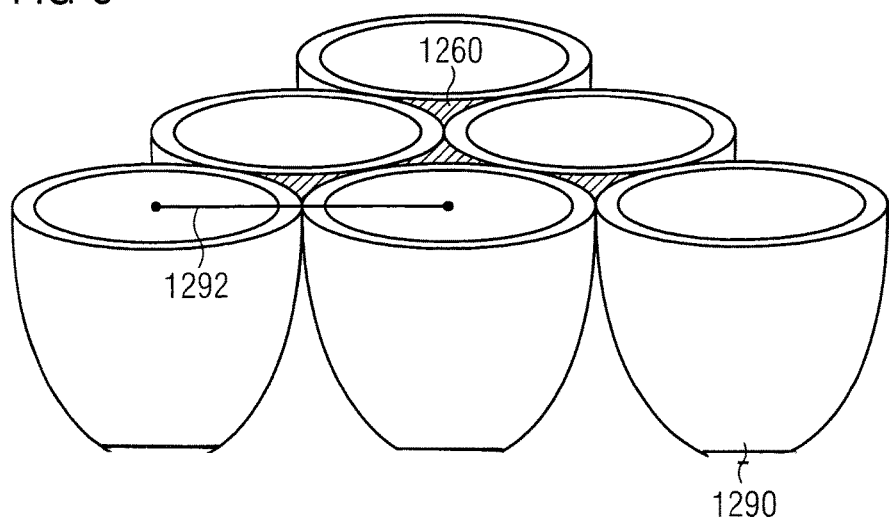
FIG. 6 is a schematic illustration of circular compound parabolic concentrator arrangement.

FIG. 6 illustrates an arrangement of circular CPCs 1290 with a distance 1292 between neighboring circular CPCs 1290. Due to the circular geometry, the extension of dark regions 1260 between (three) CPC 1290 is larger than the twice the wall thickness, which will affect the positioning of homogenization unit 300 as will become apparent below. Moreover, in comparison to the tightly packed rectangular CPCs, the overall etendue will be reduced because the output aperture has (larger) sections of non-emitting dark areas.

Furthermore, in case the reflective system comprises a mirror having the shape of a circular paraboloid, the use of the circular-beam source is advantageous. In this case, light source 2 may be made of a single circular CPC, which is coupled to a circular LED assembly, this solution allowing to obtain a circular near field.

As discussed above, the disclosed embodiments enable inter alias a rectangular projection in the far field despite a circular appearance of the exit aperture of light source 2, i.e. a circular near field. Moreover, the CPCs allow for (almost) maximal conservation of luminance of the LED light after collimation.

In addition, a large homogeneity (in luminance and in some cases in color) of the projected flat top spot in the far field is desired. The CPC arrangement does, however, transmit the discrete LED light sources such that an observer may see a corresponding inhomogeneity in luminance/color. For example, when looking at the CPC structure from the side, one will see always one side of the CPC. Due to the LED frames, one will see stripe-like structure/modulation in luminance (appearance) due to direct illumination of the sides by the LED frames with less illuminated regions in-between. This results in a grid-like structure on the CPC's output aperture. Moreover, in particular for hollow CPC, a minimum wall thickness is required which—as shown in FIG. 3—results in dark areas 260. The dark area further emphasizes the grid-like structure.

Accordingly, the homogeneity at the exit aperture without the homogenization unit 300 may still be improved. It is noted that for a high luminance projector, visual appearance of the light source is of less/no interest because only the far field projected light is observed. Thus, the perception of a uniform, fully flashed disk as the sun-imitation is a peculiar aspect of sunlight imitating lighting systems. The homogenization unit 300 is configured to remove or at least reduce depletions and luminance modulations across the output aperture.

In the following, FEC 310 based on micro-lens arrays is described as an example of a paired lens configuration connection with FIGS. 3, 6, and 7.

FEC 310 is an optical system made of a pair of lens arrays 1312, 1314 that are positioned at focal distance (inside the medium) with respect to the each other. Herein a pair of a first lens 1322 of first array 1312 and a second lens 1324 of second array 1314 are referred to as a lenslet 1320.

Figure 7:
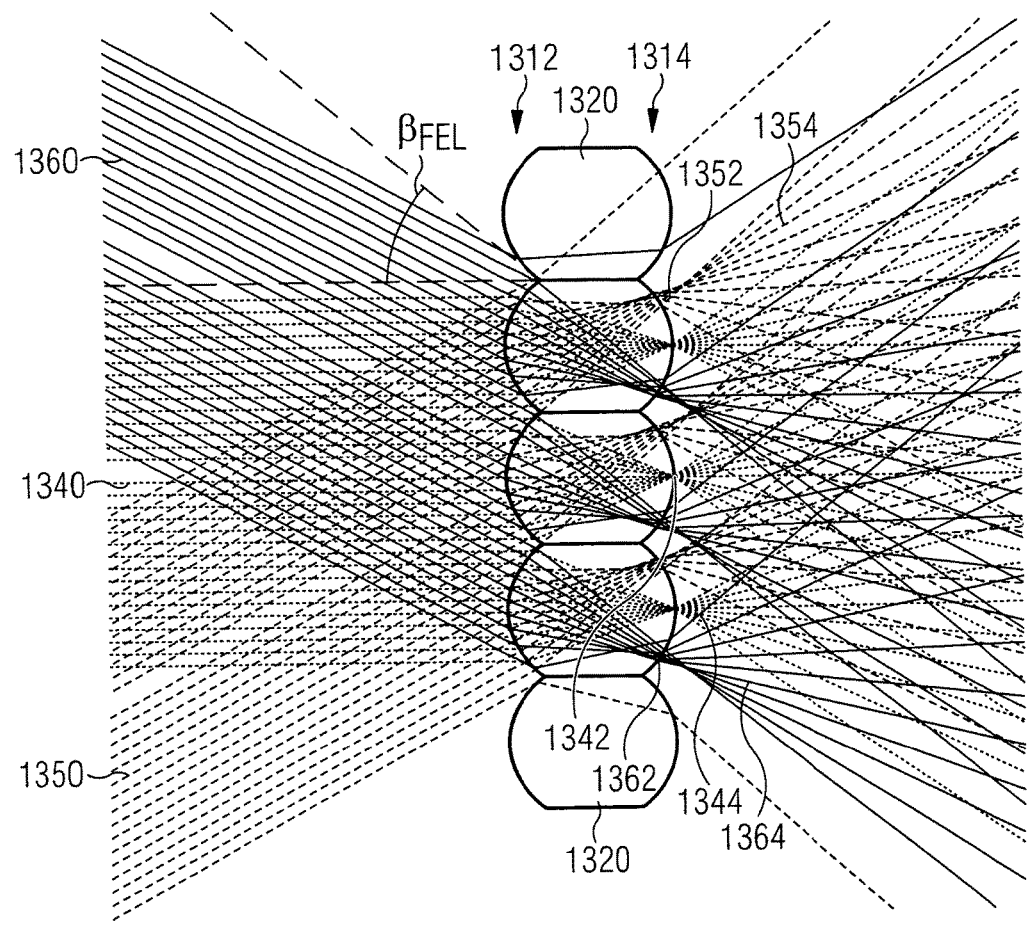
FIG. 7 is a schematic illustration a light ray's interacting with a fly's eye condenser.

FIG. 7 illustrates a sequence of five lenslets 1320. The first lens of each lenslet focusses each plane-wave component to the surface of the second lens. In particular, the light is focused in a lateral (xy) position that is specific for the plane wave propagation direction. This is illustrated in FIG. 3 as well as in FIG. 6 for three exemplary plane wave propagation directions. While in FIG. 3 propagation directions along 0° as well as along ±θ are illustrated, FIG. 7 illustrates 0° as well as two incidents angles, "smaller" than ±θ.

As shown in FIG. 3, a plane wave 1330 corresponding to a beam portion propagating along 0° will be focused centrally on the second lens (focus point 1332). A plane wave 1340 coming from the left will focus in the right side (focus point 1342) and a plane wave 1350 coming from the right will focus on the left side (focus point 1352). In the near field, e.g. when the FEC is positioned in the near field of the light source (but not too close . . . ), every lenslet 1320 is illuminated by all propagation directions within the range of the total angular spread of the CPC (|angular of propagation|<$\theta_{CPC}$).

The second lens produces in the far field an image of the first lens (e.g. a rectangle for rectangle lens aperture) when the first lens is (almost) uniformly illuminated. In other words, every lenslet remixes the light falling onto it such that one point in the first lens is imaged (is mapped to) a specific position in the far field. In other word, every point in the far field receives a contribution from every illuminated point on the first lens. This is indicated by bundles 1334, 1344, 1354 of light rays emerging from each focus point in FIG. 7.

Lenslets 1320 of FEC 310 are associated with an acceptance angle that is determined by the focal length of the lenses and the aperture of the lenses. In case the focal length of the two lenses is identical and the lenses are positioned at equal distance e=f n, the output divergence (also referred to as acceptance angle) of FEC 310 is proportional to the aperture a of the single lens divided by the focal length f.

In other words, the FEC acceptance angle $\beta$ corresponds to the (half) output angle and is linked to the geometry of the micro-lenses array by $\beta \sim a/(2f)$ with—as shown in FIG. 3—a the (full) aperture of the lens (linear dimension) and f the focal length (in air; the thickness of the layer is nf, with n the mean refractive index of the lenslet). This formula holds for small angles, while higher order corrections are needed for acceptance half angles>5° to 10°.

Relevant for the appearance of FEC 310, when looked at the output aperture, is the matching between the angular acceptance $\theta_{CPC}$ of CPC 210 and the angular acceptance $\beta_{FEC}$ of FEC 310.

If the (input) angular aperture $\theta_{CPC}$ of the beam impinging onto the first array is much smaller than the acceptance angle $\beta_{FEC}$ of the lenslets, only the central portion of the second array will receive and spread out light. Therefore, when looking at the FEC, a grid of luminous small regions corresponding to these spots will be visible (lights is emitted from the second array only by these spots).

However, when the (input) angular aperture $\theta_{CPC}$ matches (or is at least close to) the acceptance angle $\beta_{FEC}$, the whole second array lens receives light from the first array. Then, when looking at the FEC, a fully-flashed object is perceived. In some embodiments, the angles of the CPCs and the FEC are exactly matched, thereby feeding the FEC with the acceptance angles of the FEC itself.

In general, the appearance of the object, provided that the (input) angular aperture $\theta_{CPC}$ matches the acceptance angle $\beta_{FEC}$, does depend only on the illuminance profile at the level of the first array.

Specifically, any structure due to the discretization of the LED array and trimmed CPC geometry (i.e. the CPCs are not in direct contact to the LED sources) may be washed out (or at least reduced) by the remixing via FEC 310.

For completeness, rays impinging onto the first lens at angles larger than the acceptance angle $\beta_{FEC}$ are directed to an adjacent lens of the second layer (not to the corresponding lens of the lenslet), thereby producing different orders in the far field (i.e. clones of the image of the lens). This effect is referred to as cross talk between FEC lenslets and may result in background illumination within the dark box.

Figure 8:
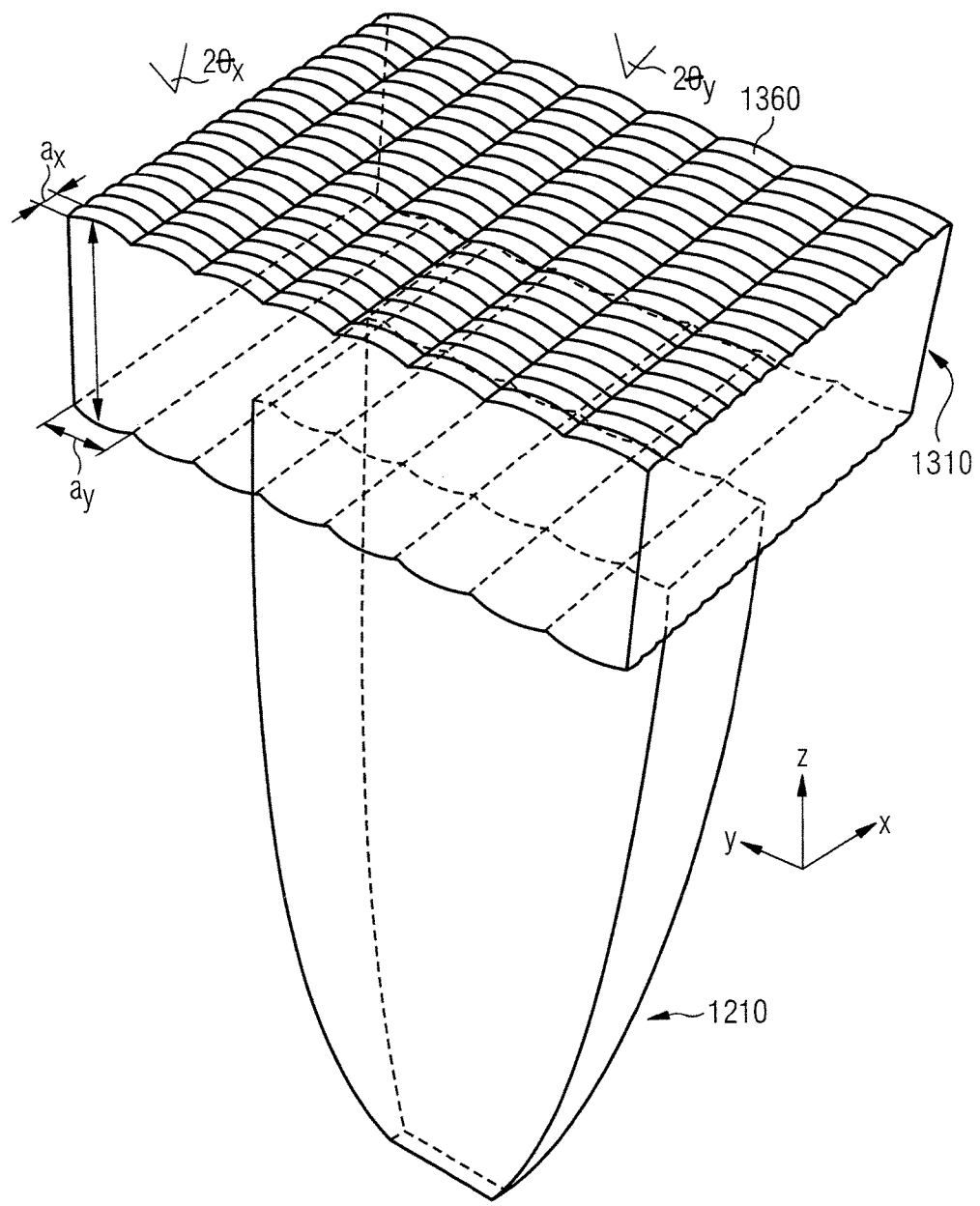
FIG. 8 is a schematic illustration of fly's eye condenser positioned downstream of a compound parabolic concentrator.

FIG. 8 illustrates the combination of a FEC 1310 with a CPC 1210. CPC 1210 provides a beam divergence of 10° and 30° in x- and y-direction, respectively. To provide a fully flashed illumination in x- and y-direction, FEC 1310 comprises rectangular lenslets 1360 that are adapted in size to the respective incoming total angular spread of the outgoing CPC beam. Specifically, an output divergence of 10° and 30° dictates a rectangular shape for the lenslets of, for example, $a_x=0.7$ mm and $a_y=2$ mm at a thickness of about $e=5$ mm.

As described above, the target to provide a continuously illuminated output aperture of light source 2 is supported by matched divergences of FEC 310 to CPCs 210. However, a continuous illumination of FEC 210 is required because non-illuminated lenslets 1360 will not emit any light.

For that purpose, homogenization unit 300, and in particular FEC 310, is positioned at some distance $D_{CPC\text{-}FEC}$ behind outlet openings 214 of collimation unit 200. Thereby, due to the divergence of the individual CPC beams, dark areas 260 created by the walls of CPCs 210 result in shadow-like areas reduced in depth (reduced contrast) and essentially may no longer be present as shadow-like areas across the beam and thus on lenslets of FEC 310. The inventors realized that a minimum distance between outlet openings 214 and FEC 310 is required to achieve a highly homogenously lit up output aperture of FEC 310. The smaller the beam divergence, the larger a distance $D_{CPC\text{-}FEC}$ is required. The same applies to the acceptance angle of the FEC, which in this case corresponds essentially to the barn divergence from the CPC (half angle). Thus, despite that the additional distance reduces the luminance as the beam is broadened, the homogeneity of the luminance is increased.

In other words, each entrance micro-lens of a micro-lens array receives a portion of the near field of the beam (i.e. illumination of the entrance lens) and projects it in the far field by imaging it with the exit micro-lens. The matching between the angular spread of CPCs and the angular spread of the micro-lens array reduces depletions in the visual appearance of the micro-lens array. If the angular aperture of CPCs is smaller than that of the micro-lens array, the exit aperture appears not fully flashed and luminance depletions appears on the micro-lenses. The modulation will result subsequently in grids, structures spoiling the appearance of the sun, and multiple shadows in the half shadow of illuminated objects. Using the herein disclosed optical system, hot spots of the entrance foil and color modulations on the entrance of the CPC (inlet openings) may be averaged out.

To provide for fully flashed output aperture, the matching of the CCP and FEC acceptance angles may be selected such that at least 70%, at least 90%, at least 85%, at least 95% or even 100% of the surface of the second lens array is illuminated. Similarly, up to 10% or up to 5% of a neighboring micro-lens may be illuminated with still having an acceptable homogenous appearance of the output aperture.

For CPC arrangements not having any dark regions, the above requirement for a minimum distance may not be given. However, as explained above, introducing a minimum distance between the micro-lens array and the CPC outlet openings will further reduce or even overcome structures induced by the dark regions or will smear out by means of propagation residual near field structures (both in color and luminance) due to LED discretization, for example.

With respect to the matching of the angular apertures, it is proposed to select $0.90\ \beta_{FEC} \leq \theta_{CPC} \leq 1.10\ \beta_{FEC}$. This would, for example, apply to 10° and 30° divergences. In some embodiments, the following ratios were acceptable: $\theta_{CPC}(30°)/\beta_{FEC}(30°)=1.05$ and $\theta_{CPC}(10°)/\beta_{FEC}(10°)=0.90$. In some embodiments, even larger mismatches could in principle work such as $0.85\ \beta_{FEC} \leq \theta_{CPC} \leq 1.15\ \beta_{FEC}$.

Alternative divergences for CPCs and FECs are in the range of, for example, 7° to 20° for the smaller angle and 15° to 50° for the larger angle.

For dielectric CPCs (instead of hollow CPCs) at least in principle, one could produce many single dielectric CPCs and assemble them in an array without separation walls. Accordingly, a minimum distances may not be necessary or it may result from non-idealities caused by the manufacturing process in the transition region.

As indicated above, although some distance is introduced between CPCs and FEC, no lens is used immediately downstream the CPCs to not insert additional surface(s) to affect the beam. Thus, one reduces slightly the final average luminance but obtains a better input for the FEC.

With respect to the minimum distance, it was estimated based on $\theta_{CPC}$ and the extension of the dark region that in order to assure an overlapping of beamlets form adjacent CPCs, a minimum distance $D_{min}$ is $p/(2\ \tan(\theta_{CPC}))$, with p being the extension of the dark region, usually in the direction of the minimum divergence, which dominates the effect of the dark areas. For larger distances, the FEC receives, in principle, an illumination without the strong, dark grid or with the strong, dark grid significantly and progressively reduced.

For hollow rectangular CPCs with dark regions (at the outlet side of the CPC) of about 0.8 mm (corresponding to wall thickness of a reflective Aluminum double foil of 0.4 mm) and a minimum divergence of 10°, the appearance of the black lines (grid-like "shadow" of the wall) were evaluated to disappear at distances in the range from 10 mm to 30 mm. The theoretical minimum estimation of 10 mm indicates where the overlap between two neighboring beams starts. For a good deletion of the perceived dark grid, a minimum distance of for example, at least twice that minimum length, for example at least 25 mm or at least 30 mm should be applied. However, the longer the selected distance, the larger the reduction of luminance will be.

For embodiments with circular CPC(s), FEC configurations with hexagonally shaped lenslets may provide for a hexagonal far field, essentially an approximated circular far field.

Figure 9:
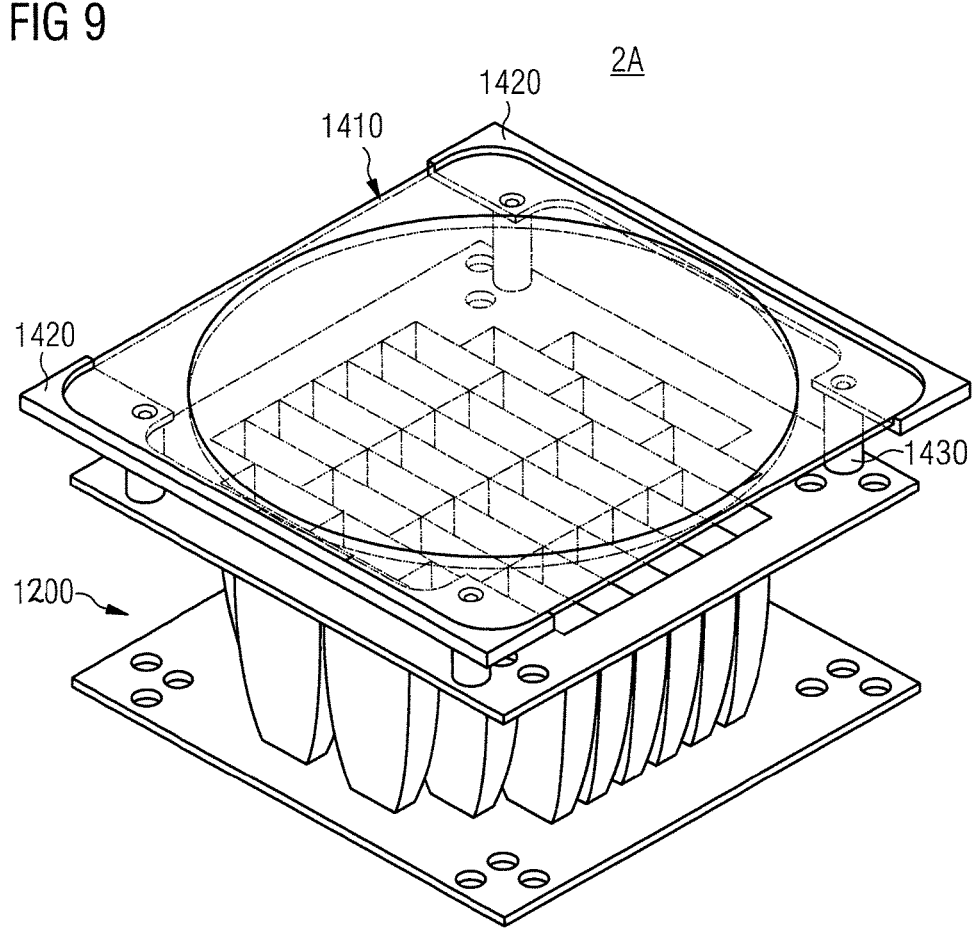
FIG. 9 is a perspective view of a mounted optical system comprising a collection unit and a homogenization unit.

FIG. 9 shows an optical system 2A comprising collimation unit 1200 of FIG. 5 in the mounted state and attached thereto, an FEC 1410. FEC 1410 is mounted at a preselected distance (larger than the minimum distance $D_{min}$) from the outlet openings of the CPCs of collimation unit 1200 via frame brackets 1420 and separators 1430. FEC 1410 may be made from a mold that enforces the micro-lens structure in a circular area.

To further avoid repetitive structure in the exit aperture, the dimensions of the lenslets and the outlet opening are selected such that there is a shift in position between neighboring CPCs, e.g. lenslet length is not an integer of the length of the CPC (including wall thickness).

Referring to FIG. 1, window-like unit 6 is illuminated by light source 2, for example, having at the most a folding mirror system in-between the exit aperture and window-like unit 6. As discussed above with respect to the lighting system, diffused light generator 20 is, for example, shaped as a panel such as a parallelepiped panel. In particular, the panel may be delimited by two parallel surfaces and may be thin with a thickness, measured along a direction perpendicular to the surfaces, which has a square value not larger than 5%, for example not larger than 1%, of the area of the surfaces.

Window-like unit 6 may be a Rayleigh panel which substantially does not absorb light in the visible range and which diffuses light in the blue wavelength range (around 450 nm) at least 1.2 times, for example at least 1.4 times, such as at least 1.6 times more efficiently than light in the red wavelength range around (around 650 nm), wherein a diffusion efficiency is given by the ratio between the diffused light radiant power with respect the impinging light radiant power.

In some embodiments, diffused light generator 20 comprises a solid matrix of a first material (e.g., a resin or plastics having excellent optical transparency), in which nanoparticles of a second material (e.g. inorganic oxide such as ZnO, TiO2, ZrO2, SiO2, Al2O3) are dispersed. The second material has a refractive index different from the first material's refractive index. Preferably, the first and the second material basically do not absorb electromagnetic radiation in the visible wavelength range.

Moreover, diffused light generator 20 may be uniform, in the sense that, given any point of diffused light generator 20, the physical characteristics of diffused light generator 20 in that point does not depend on the position of that point. Furthermore, diffused light generator 20 may be monolithic.

In some embodiments, the spherically or otherwise shaped nanoparticles may be monodisperse and/or have an effective diameter D within the range [5 nm-350 nm], such as [10 nm-250 nm], or even [40 nm-180 nm], or [60 nm-150 nm], where the effective diameter D is given by the diameter of the nanoparticles times the first material's refractive index.

Moreover, nanoparticles are distributed inside diffused light generator 20 in a manner such that their areal density, namely the number N of nanoparticles per square meter, i.e. the number of nanoparticles within a volume element delimited by a portion of the surface of diffused light generator 20 having an area of 1 m2, satisfies the condition N≥Nmin, where:

$$N_{min} = v \frac{10^{-29}}{D^6} \cdot \left| \frac{m^2 + 2}{m^2 - 1} \right|^2$$

wherein v is a dimensional constant equal to 1 meter6, Nmin is expressed as a number/meter2, the effective diameter D is expressed in meters and wherein in is equal to the ratio of the second material's refractive index to the first material's refractive index.

In some embodiments, the nanoparticles are distributed homogenously, at least as far as the areal density is concerned, i.e. the areal density is substantially uniform on diffused light generator 20, but the nanoparticle distribution may vary across diffused light generator 20. The areal density varies, for example, by less than 5% of the mean areal density. The aerial density is here intended as a quantity defined over areas larger 0.25 mm2.

In some embodiments, the areal density varies, so as to compensate illumination differences over diffused light generator 20, as lit by light source 2. For example, the areal density N(x,y) at point (x,y) may be related to the illuminance I(x,y) produced by light source 2 at point (x,y) via the equation N(x,y)=Nav*Iav/I(x,y)±5%, where Nav and Iav are the averaged illuminance and areal density, these latter quantities being averaged over the surface of diffused light generator 20. In this case the luminance of diffused light generator 20 may be equalized, in spite of the non-uniformity of the illuminance profile of light source 2 on diffused light generator 20. In this context, the luminance is the luminous flux of a beam emanating from a surface (or falling on a surface) in a given direction, per unit of projected area of the surface as viewed from the given direction, and per unit of solid angle, as reported, as an example, in the standard ASTM (American Society for Testing and Materials) E284-09a.

In the limit of small D and small volume fractions (i.e. thick panels) an areal density N≈Nmin is expected to produce scattering efficiency of about 5%. As the number of nanoparticles per unit area gets higher, the scattering efficiency is expected to grow proportionally to N, until multiple scattering or interferences (in case of high volume fraction) occur, which might compromise color quality. The choice of the number of nanoparticles is thus biased by the search for a compromise between scattering efficiency and desired color, as described in detail in EP 2 304 478 A1. Furthermore, as the size of nanoparticles gets larger, the ratio of the forward to backward luminous flux grows, such ratio being equal to one in the Rayleigh limit. Moreover, as the ratio grows, the aperture of the forward scattering cone gets smaller. Therefore, the choice of the ratio is biased by the search for a compromise between having light scattered at large angles and minimizing the flux of backward scattered light. However, in a per se known manner, an antireflection layer (not shown) may be deposited on diffused light generator 20, with the aim of minimizing reflection; by doing so, the luminous efficiency of lighting system 1 is raised and the visibility of diffused light generator 20 (as a physical element) from an observer in room 30 is reduced.

In some embodiments, nanoparticles may not have a spherical shape; in such case, the effective diameter D can be defined as the effective diameter of the equivalent spherical particles, namely the effective diameter of spherical particles having the same volume as the aforementioned nanoparticles.

Furthermore, in some embodiments, the nanoparticles are polydispersed, i.e. their effective diameters are characterized by a distribution N(D). Such distribution describes the number of nanoparticles per surface unit and unit interval of effective diameter in a neighborhood of the effective diameter D (that is, the number of particles per surface unit having an effective diameter between D1 e D2 is equal to $$N_{D_2-D_1} = \int_{D_1}^{D_2} N(D)dD).$$

These effective diameters may fall in the range [5 nm-350 nm], i.e. the distribution may be non-null within this range. In this case, considering that scattering efficiency grows approximately, i.e. in the limit of small particles, with the sixth power of the nanoparticle's diameter, the polydisperse distribution behaves approximately as a monodisperse distribution with a representative diameter D'eff defined as:

$$D'_{eff} = \left\{ \frac{\int N(D) D^6 dD}{N} \right\}^{1/6}$$

where $$N = \int N(D) dD$$

D'eff may by selected so as to lie within the range [5 nm-350 nm], preferably [10 nm-250 nm], more preferably [40 nm-180 nm], still more preferably [60 nm-150 nm].

In some embodiments, window-like unit 6 may include a chromatic mirror that is illuminated by light source 2. Accordingly, a reflection of light beam 3 is combined with the scattering effect. Chromatic mirror may comprise a mirroring surface and a diffusing layer in front of the mirroring surface. The diffusing layer may behave as a Rayleigh diffuser described above for the transmission configuration. For example, the diffusing layer preferentially scatters short-wavelength components of impinging light with respect to long-wavelength components of impinging light. For example, the chromatic mirror could be based on a glass mirror, plastic mirror, or metal mirror.

In some embodiments, the natural quality of lighting improves whenever the maximum luminance of light source 2 is greater than $0.1*10^6$ cd/m$^2$, for example at least $1*10^6$ cd/m$^2$, or at least $5*10^6$ cd/m$^2$ or more. For those values, as a matter of fact, light source 2 generates enough glare for the source itself to be difficult to look at, thereby preventing the observer from evaluating the source's distance by means of the mechanism of eye focusing. Those luminance values contribute to obtain an infinite breakthrough effect. Moreover, glare makes it difficult to detect possible non-uniformities in the luminance profile of light source 2, thus making it difficult to detect differences between the image of light source 2 and an image of the real sun.

In some embodiments, the exit aperture approximates a circle, the image of the first light source 2 perceived by the observer is still circularly shaped because the optical system does not twist the image. In some embodiments, the window-like unit has an elliptic shape illuminated, for example, by a light beam having circular divergence. However, other shapes are also possible, e.g. an elongated shape. In some embodiments, a folding mirror may be shaped as the portion of a paraboloid with cylindrical symmetry.

Whenever the reflective system includes at least one paraboloid with cylindrical symmetry, the exit aperture may approximate an elliptic shape, so that the different magnifications introduced along the orthogonal axes are compensated, thus allowing for the creation of a circle-shaped light spot on the observer's retina.

Herein applications of a high quality high luminance light source in the field of in-door lighting has been described. However, it will be apparent to the skilled person that also external illumination may be performed with the lighting source. Similarly, the light source may also be applied to projection systems, in particular of a high luminance is of interest, that are for example configured for uniform illumination of rectangular targets such as artwork and paintings.

Although the preferred embodiments of this invention have been described herein, improvements and modifications may be incorporated without departing from the scope of the following claims.

The invention claimed is:

1. An optical system for receiving and collimating light to provide for a continuously emitting output aperture, the optical system comprising:
    a collimation unit comprising an array of parabolic interfaces that each define an inlet opening and an outlet opening wherein at least one parabolic interface is configured to:
        reflect light entering through the inlet opening through the outlet opening, wherein a minimum divergence of the reflected light defines a direction of minimum divergence, and
        limit the angular spread of the light to an acceptance angle ($\theta_{CPC}$) associated with the at least one parabolic interface; and
    a homogenization unit for homogenizing the light emerging from the collimation unit, the homogenization unit comprising a lens array with pairs of a first lens and a second lens, wherein the lens array is configured such that light from the outlet opening collected by a first lens illuminates the respective second lens,
    wherein:
        an output side of the homogenization unit provides a circular or elliptical exit aperture in the near field; and
        an outlet side of the collimation unit comprises dark areas that extend in the direction of minimum divergence for an extension p between outlet openings, and wherein the first lenses are displaced with respect to the outlet openings by a distance that depends on the lateral extension p of the dark area and the acceptance angle ($\theta_{CPC}$) of the collimation unit and is at least a minimum distance $D_{min}$ is p/(2 tan($\theta_{CPC}$)) that provides for illumination of the first lenses opposing the dark areas.

2. The optical system of claim 1, wherein the distance is at least 3 to 5 times the minimum distance $D_{min}$ and at the most 5 to 20 times the minimum distance $D_{min}$.

3. The optical system of claim 1, wherein the collimation unit comprises a plurality of rectangular compound parabolic concentrators, each comprising two pairs of opposing parabolic interfaces, wherein the outlet openings of the plurality of rectangular compound parabolic concentrators are arranged to emit, in combination, an approximately circular or elliptical beam in the near field that, in the far field, transforms into a rectangular beam.

4. The optical system of claim 1, wherein the dimensions and the focusing property of the lenses of the lens array are adapted to the acceptance angle ($\theta_{CPC}$) such that the light collected by the first lens is essentially distributed over the complete downstream surface of the second lens.

5. The optical system of claim 1, wherein the acceptance angle ($\theta_{CPC}$) associated with the respective parabolic interface comprises a low divergence direction and a high divergence direction, wherein said acceptance angle is in the range from 3.5° to 10° for the low divergence direction and in the range from 7.5° to 25° for the high divergence direction.

6. The optical system of claim 1, wherein the outlet opening extends along a plane that is perpendicular to an axis of the parabolic interface, a plurality of pairs of the first and second lenses align with each outlet opening, and edges of each outlet opening of a parabolic interface are shifted along the plane from edges of the pairs of the first and second lenses.

7. The optical system of claim 3, wherein, in a central section of a cross section of the collimation unit, rectangular compound parabolic concentrators are arranged in rows of the same number of rectangular compound parabolic concentrators thereby collectively defining a rectangular shape with a long side and a short side, and,
    next to each long side, an isosceles trapezoid section is arranged, wherein each isosceles trapezoid section comprises at least one row of rectangular compound parabolic concentrators arranged in a stepwise shape, said at least one row of rectangular compound parabolic concentrators arranged in said stepwise shape comprising one less rectangular compound parabolic concentrator than the number of rectangular compound parabolic concentrators in the rows of the long sides of said rectangular shape of the central section, wherein the outermost row of each of the isosceles trapezoid sections has a length that extends approximately as long as the short side of the central section.

8. A light source comprising:
a light emitting unit with a light emission pattern that is a Lambertian or quasi-Lambertian emission pattern of a planar LED; and
an optical system according to claim 1, wherein the light emission pattern overlaps with the inlet opening of the optical system.

9. The light source of claim 8, wherein the light emitting unit comprises a light emitting area associated to the at least one parabolic interface and the light emitting area is positioned at a distance from the inlet opening in direction of a symmetry axis associated with the collimation unit.

10. The light source of claim 8, wherein the light emitting unit comprises a plurality of LED arrangements with emitting areas that are arranged side by side to form an LED strip and form a rectangular zone emitting light interrupted by dark areas in-between LED emitting areas, and an LED strip is associated with a rectangular compound parabolic concentrator.

11. A lighting system, comprising:
a light source according to claim 8 for providing a light beam of directed non-diffused light with a first correlated color temperature along a main light beam direction; and
a unit comprising at least one of a lighting system exit window or a diffused light generator for generating diffused light at a second correlated color temperature, which is larger than the first correlated color temperature, wherein the unit is positioned in the far field of the light beam and the size of the unit is adapted to the size of the far field of the light beam.

12. The lighting system of claim 11, further comprising a propagation system with folding optics to direct the light beam onto the unit, and wherein the folding optics has a minimum distance of at least 0.4 m or at least 1 m from the lens array.

13. The lighting system of claim 11, wherein the light source is a light source having: a divergence in the range from 5° to 60°, 7° to 20°, or 15° to 50°.

14. The optical system of claim 1, wherein:
the array of parabolic interfaces is a two-dimensional array of rectangular parabolic interfaces arranged next to each other to form a two-dimensional array of tightly packed outlet openings; and
the two-dimensional array of tightly packed outlet openings approximate a circular or elliptical surface.

15. The optical system of claim 1, wherein:
the first and second lenses of the lens array are rectangular micro-lenses; and
the lens array is arranged in a circular or elliptical area.

16. An optical system for receiving and collimating light to provide for a continuously emitting output aperture, the optical system comprising:
a collimation unit comprising an array of parabolic interfaces that each define an inlet opening and an outlet opening, wherein at least one parabolic interface is configured to reflect light entering through the inlet opening through the outlet opening and limit the angular spread of the light to an acceptance angle ($\theta_{CPC}$) associated with the at least one parabolic interface; and
a homogenization unit for homogenizing the light emerging from the collimation unit, the homogenization unit comprising a lens array with pairs of a first lens and a second lens, wherein the lens array is configured such that light from the outlet opening collected by a first lens illuminates the respective second lens, wherein the lens array is associated with an acceptance angle ($\beta_{FEC}$) defined by $\tan(\beta_{FEC})=a/2f$, with a being the full aperture of the first lens and f being the focal length of the first lens,
wherein:
an output side of the homogenization unit provides a circular or elliptical exit aperture; and
the relation of the acceptance angle ($\theta_{CPC}$) associated with the at least one parabolic interface to the acceptance angle ($\beta_{FEC}$) associated with the lens array is given by $0.85\ \beta_{FEC} \leq \theta_{CPC} \leq 1.15\ \beta_{FEC}$.

17. The optical system of claim 16, wherein the dimensions and the focusing property of the lenses of the lens array are adapted to the acceptance angle ($\theta_{CPC}$) such that the light collected by the first lens is essentially distributed over the complete downstream surface of the second lens.

18. The optical system of claim 16, wherein the relation of the acceptance angle ($\theta_{CPC}$) to the acceptance angle ($\beta_{FEC}$) is given by: $0.90\ \beta_{FEC} \leq \theta_{CPC} \leq 1.10\ \beta_{FEC}$ or $\beta_{FEC}=\theta_{CPC}$.

19. The optical system of claim 16, wherein the collimation unit comprises a plurality of rectangular compound parabolic concentrators, each comprising two pairs of opposing parabolic interfaces, wherein the outlet openings of the plurality of rectangular compound parabolic concentrators are arranged to emit, in combination, an approximately circular or elliptical beam in the near field that, in the far field, transforms into a rectangular beam.

20. The optical system of claim 19, wherein the rectangular compound parabolic concentrators provides for a low divergence direction and a high divergence direction orthogonal thereto, and the dimensions and focusing property of the lenses of the lens array are adapted accordingly for a rectangular shape such that in both directions the relation of the acceptance angle ($\theta_{CPC}$) associated with the respective parabolic interface to the acceptance angle ($\beta_{FEC}$) of the lens array is given by $0.85\ \beta_{FEC} \leq \theta_{CPC} \leq 1.15\ \beta_{FEC}$ or $0.90\ \beta_{FEC} \leq \theta_{CPC} \leq 1.10\ \beta_{FEC}$ or $\beta_{FEC}=\theta_{CPC}$; and
the matching of the acceptance angles is selected such that at least 70% of the surface of the second lens array is illuminated.

21. The optical system of claim 20, wherein the collected light is essentially distributed over the complete lens.

22. The optical system of claim 19, wherein the acceptance angle ($\theta_{CPC}$) associated with the respective parabolic interface comprises a low divergence direction and a high divergence direction, wherein said acceptance angle is in the range from 3.5° to 10° for the low divergence direction and in the range from 7.5° to 25° for the high divergence direction.

23. The optical system of claim 19, wherein, in a central section of a cross section of the collimation unit, rectangular compound parabolic concentrators are arranged in rows of the same number of rectangular compound parabolic concentrators, thereby collectively defining a rectangular shape with a long side and a short side, and,
next to each long side, an isosceles trapezoid section is arranged, wherein each isosceles trapezoid section comprises at least one row of rectangular compound parabolic concentrators arranged in a stepwise shape, said at least one row of rectangular compound parabolic concentrators arranged in said stepwise shape comprising one less rectangular compound parabolic concentrator than the number of rectangular compound parabolic concentrators in the rows of the long sides of said rectangular shape of the central section, wherein the outermost row of each of the isosceles trapezoid sections has a length that extends approximately as long as the short side of the central section.

24. The optical system of claim 23, wherein the rows of rectangular compound parabolic concentrators in each isosceles trapezoid section extend symmetrically in the direction of the long side of the central section with respect to the central symmetry axis; and
wherein each of the rows of the rectangular compound parabolic concentrators of the isosceles trapezoid sections are shifted by half a length of a single rectangular compound parabolic concentrator, from one row to the next row in the stepwise shape of each of the isosceles trapezoid sections.

25. The optical system of claim 19, further comprising a mask formed to approximate the shape of the exit aperture to a circular or elliptical shape by blocking corners of rectangular compound parabolic concentrators.

26. The optical system of claim 25, wherein the mask is suitable for blocking light coming from portions of the lens array which are arranged around an overall circular or elliptical exit aperture.

27. The optical system of claim 16, wherein the outlet opening extends along a plane that is perpendicular to an axis of the parabolic interface, a plurality of pairs of the first and second lenses align with each outlet opening, and edges of each outlet opening of a parabolic interface are shifted along the plane from edges of the pairs of the first and second lenses.

28. The optical system of claim 16, wherein the outlet side of the collimation unit comprises dark areas that are between outlet openings, and the first lenses are displaced with respect to the outlet openings by a distance that depends on the lateral extension p of the dark area and the acceptance angle ($\theta_{CPC}$) of the collimation unit.

29. The optical system of claim 28, wherein the distance between the first lenses and the outlet openings is at least a minimum distance $D_{min}$ given by $p/(2 \tan(\theta_{CPC}))$ providing for illumination of also the first lenses opposing the dark areas with lateral extension p; and
wherein the distance is at least 3 to 5 times the minimum distance $D_{min}$; and
wherein the distance is at the most 5 to 20 times the minimum distance $D_{min}$.

30. The optical system of claim 28, wherein the dark areas are created by walls of hollow compound parabolic concentrators or gaps between neighboring rectangular compound parabolic concentrators.

31. The optical system of claim 28, wherein the distance is selected such that the first lenses opposing the dark areas are essentially still in the near field of the respective CPC and the cross section of the near field beam has not broadened more than 10% of the beam diameter.

32. The optical system of claim 16, wherein the at least one parabolic interface, the inlet opening, and the outlet opening are parts of a hollow compound parabolic concentrators or a total internal reflection compound parabolic concentrators.

33. The optical system of claim 16, wherein the light emerging from the outlet opening directly—without further interaction with another optical element—falls onto the lens array.

34. The optical system of claim 16, wherein the collimation unit further comprises at least one mounting plate for alignment of a plurality of compound parabolic concentrators, which is adjusted to the arrangement of the plurality of compound parabolic concentrators; and
wherein the collimation unit further comprises an inlet mounting plate with a mounting opening for each of the plurality of compound parabolic concentrators, which is dimensioned such that the inlet side reaches through the respective mounting opening in the mounted state, an outlet mounting plate with a single mounting opening, which is adjusted to the arrangement of the plurality of compound parabolic concentrators, and at least one distance holder for mounting the inlet mounting plate and the outlet mounting plate at a respective distance and relative orientation.

35. A light source comprising:
a light emitting unit with a light emission pattern that is a Lambertian or quasi-Lambertian emission pattern of a planar LED; and
an optical system according claim 16, wherein the light emission pattern overlaps with the inlet opening of the optical system.

36. The light source of claim 35, wherein the light emitting unit comprises a light emitting area associated to the at least one parabolic interface and the light emitting area is positioned at a distance from the inlet opening in direction of a symmetry axis associated with the collimation unit.

37. The light source of claim 35, wherein the light emitting unit comprises a plurality of LED arrangements with emitting areas that are arranged side by side to form an LED strip and form a rectangular zone emitting light interrupted by dark areas in-between LED emitting areas, and an LED strip is associated with a rectangular compound parabolic concentrator.

38. The light source of claim 35, wherein the light source is formed by a plurality of light emitting devices and a plurality of compound parabolic concentrator, each reflective compound parabolic concentrator having an inlet opening and an outlet opening, the area of the inlet opening being smaller than the area of the outlet opening and being shaped as a rectangle, and each light emitting device is optically coupled to the inlet opening of a respective compound parabolic concentrator.

39. A lighting system, comprising:
a light source according to claim 35 for providing a light beam of directed non-diffused light with a first correlated color temperature along a main light beam direction; and
a unit comprising at least one of a lighting system exit window or a diffused light generator for generating diffused light at a second correlated color temperature, which is larger than the first correlated color temperature, wherein the unit is positioned in the far field of the light beam and the size of the unit is adapted to the size of the far field of the light beam.

40. The lighting system of claim 39, further comprising a propagation system with folding optics to direct the light beam onto the unit, and wherein the folding optics has a minimum distance of at least 0.4 m or at least 1 m from the lens array.

41. The lighting system of claim 39, wherein the diffused light generator is configured to substantially transmit light in the visible range and to scatter more efficiently the short-wavelengths components in respect to the long-wavelength components of the light beam.

42. The lighting system of claim 39, wherein the light source is a light source having a divergence in the range from 5° to 60°, 7° to 20°, or 15° to 50°.

43. The lighting system of claim 39, wherein the light source and a density of the particle distribution across the diffused light generator are selected such that the product between the density of the particle distribution and the illuminance provided by the light source during operation of the lighting system is substantially constant on the diffused light generator.

44. The lighting system of claim 39, further comprising a propagation system configured to direct the light beam onto the unit, wherein the diffused light generator has a panel shape that is adapted to the divergence of the light beam and the propagation system.

45. The lighting system of claim 39, wherein the unit comprises a diffused light generator film applied onto a transmitting or reflecting substrate and/or receives light to be scattered from a second light source.

46. The lighting system of claim 39, wherein the diffused light generator comprises a matrix of a first material, wherein first particles of a second material are dispersed in the first material, said first and second materials having, respectively, a first and a second refractive indexes, said first particles having diameters such that the product of said diameters and the first refractive index is in the range 5 nm to 350 nm.

47. The optical system of claim 16, wherein the first lens and the second lens have the same focal length f and are positioned at a distance e equal to the focal length f times n, the averaged index of refraction between the lenses: e=fn.

48. The optical system of claim 16, wherein:
the array of parabolic interfaces is a two-dimensional array of rectangular parabolic interfaces arranged next to each other to form a two-dimensional array of tightly packed outlet openings; and
the two-dimensional array of tightly packed outlet openings approximate a circular or elliptical surface.

49. The optical system of claim 16, wherein:
the first and second lenses of the lens array are rectangular micro-lenses; and
the lens array is arranged in a circular or elliptical area.

50. A lighting system for producing a continuously emitting output aperture, the lighting system comprising:
a light source for providing a light beam of directed non-diffused light with a first correlated color temperature along a main light beam direction, the light source comprising:
a light emitting unit with a light emission pattern having a Lambertian or quasi-Lambertian emission pattern of a planar LED; and
an optical system for receiving and collimating light, the optical system comprising:
a collimation unit comprising at least one parabolic interface that defines an inlet opening and an outlet opening, wherein the at least one parabolic interface is configured to reflect light entering through the inlet opening through the outlet opening and limit the angular spread of the light to an acceptance angle ($\theta_{CPC}$) associated with the at least one parabolic interface; and
a homogenization unit for homogenizing the light emerging from the collimation unit, the homogenization unit comprising a lens array with pairs of a first lens and a second lens, a plurality of pairs of the first and second lenses align with each outlet opening, wherein the lens array is configured such that light from the outlet opening collected by a first lens illuminates the respective second lens to provide for a continuously emitting output aperture, wherein the light emission pattern overlaps with the inlet opening of the optical system; and
a unit configured as a diffused light generator for generating diffused light at a second correlated color temperature, which is larger than the first correlated color temperature, wherein the unit is positioned in the far field of the light beam and the size of the unit is adapted to the size of the far field of the light beam, and wherein the diffused light generator is configured to substantially transmit light in the visible range and to scatter more efficiently the short-wavelengths components in respect to the long-wavelength components of the light beam;
wherein the collimation unit comprises a plurality of rectangular compound parabolic concentrators, each comprising two pairs of opposing parabolic interfaces, wherein the outlet openings of the plurality of rectangular compound parabolic concentrators are arranged to emit, in combination, an approximately circular or elliptical beam in the near field that, in the far field, transforms into a rectangular beam.

51. The lighting system of claim 50, wherein the dimensions and the focusing property of the lenses of the lens array are adapted to the acceptance angle ($\theta_{CPC}$) such that the light collected by the first lens is essentially distributed over the complete downstream surface of the second lens.

52. The lighting system of claim 50, wherein the lens array is associated with an acceptance angle ($\beta_{FEC}$) defined by $\tan(\beta_{FEC})=a/2f$, with a being the full aperture of the lens and f being the focal length of the lens and wherein the relation of the acceptance angle ($\theta_{CPC}$) to the acceptance angle ($\beta_{FEC}$) is given by $0.85\ \beta_{FEC} \leq \theta_{CPC} \leq 1.15$ NEC or $0.90\ \beta_{FEC} \leq \theta_{CPC} \leq 1.10\ \beta_{FEC}$ or $\beta_{FEC}=\theta_{CPC}$.

53. The lighting system of claim 50, wherein, in a central section of a cross section of the collimation unit, rectangular compound parabolic concentrators are arranged in rows of the same number of rectangular compound parabolic concentrators thereby collectively defining a rectangular shape with a long side and a short side, and,
next to each long side, an isosceles trapezoid section is arranged, wherein each isosceles trapezoid section comprises at least one row of rectangular compound parabolic concentrators arranged in a stepwise shape, said at least one row of rectangular compound parabolic concentrators arranged in said stepwise shape comprising one less rectangular compound parabolic concentrator than the number of rectangular compound parabolic concentrators in the rows of the long sides of said rectangular shape of the central section, wherein the outermost row of each of the isosceles trapezoid sections has a length that extends approximately as long as the short side of the central section.

54. The lighting system of claim 50, wherein the outlet side of the collimation unit comprises dark areas that are between outlet openings and the first lenses are displaced with respect to the outlet openings by a distance that depends on the lateral extension p of the dark area and the acceptance angle ($\theta_{CPC}$) of the collimation unit.

55. The lighting system of claim 50, wherein the collimation unit further comprises an inlet mounting plate with a mounting opening for each of the plurality of compound parabolic concentrators, which is dimensioned such that the inlet side reaches through the respective mounting opening in the mounted state, an outlet mounting plate with a single mounting opening, which is adjusted to the arrangement of the plurality of compound parabolic concentrators, and at least one distance holder for mounting the inlet mounting plate and the outlet mounting plate at a respective distance and relative orientation.

56. The lighting system of claim 50, further comprising a propagation system with folding optics to direct the light beam onto the unit, and has a minimum distance of at least 0.4 m or at least 1 m from the lens array.

57. The lighting system of claim 50, wherein the diffused light generator comprises a matrix of a first material, wherein first particles of a second material are dispersed in the first material, said first and second materials having, respectively, a first refractive index and a second refractive index, said first particles having diameters such that the product of said diameters and the first refractive index is in the range 5 nm to 350 nm.

58. A lighting system for producing a continuously emitting output aperture, the lighting system comprising:
  a light source for providing a light beam of directed non-diffused light with a first correlated color temperature along a main light beam direction, the light source comprising:
    a light emitting unit with a light emission pattern having a Lambertian or quasi-Lambertian emission pattern of a planar LED; and
    an optical system for receiving and collimating light, the optical system comprising:
      a collimation unit comprising at least one parabolic interface that defines an inlet opening and an outlet opening, wherein the at least one parabolic interface is configured to reflect light entering through the inlet opening through the outlet opening and limit the angular spread of the light to an acceptance angle ($\theta_{CPC}$) associated with the at least one parabolic interface; and
      a homogenization unit for homogenizing the light emerging from the collimation unit, the homogenization unit comprising a lens array with pairs of a first lens and a second lens, a plurality of pairs of the first and second lenses align with each outlet opening, wherein the lens array is configured such that light from the outlet opening collected by a first lens illuminates the respective second lens to provide for a continuously emitting output aperture, wherein the light emission pattern overlaps with the inlet opening of the optical system; and
  a unit configured as a diffused light generator for generating diffused light at a second correlated color temperature, which is larger than the first correlated color temperature, wherein the unit is positioned in the far field of the light beam and the size of the unit is adapted to the size of the far field of the light beam, and wherein the diffused light generator is configured to substantially transmit light in the visible range and to scatter more efficiently the short-wavelengths components in respect to the long-wavelength components of the light beam;
  wherein an output side of the homogenization unit provides a circular or elliptical exit aperture in the near field, the far field being adapted to a rectangular geometry of the unit.

* * * * *